US008585410B2

(12) United States Patent
Nielsen et al.

(10) Patent No.: US 8,585,410 B2
(45) Date of Patent: Nov. 19, 2013

(54) SYSTEMS FOR AND METHODS OF SIMULATING FACILITIES FOR USE IN LOCATE OPERATIONS TRAINING EXERCISES

(75) Inventors: Steven Nielsen, North Palm Beach, FL (US); Curtis Chambers, Palm Beach Gardens, FL (US); Jeffrey Farr, Jupiter, FL (US); Thomas William Bachelder, Apex, NC (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 354 days.

(21) Appl. No.: 12/818,432

(22) Filed: Jun. 18, 2010

(65) Prior Publication Data

US 2010/0330542 A1     Dec. 30, 2010

Related U.S. Application Data

(60) Provisional application No. 61/220,262, filed on Jun. 25, 2009, provisional application No. 61/220,271, filed on Jun. 25, 2009.

(51) Int. Cl.
    *G09B 19/00*     (2006.01)
(52) U.S. Cl.
    USPC ........................................................ 434/219
(58) Field of Classification Search
    CPC ...................................................... G09B 19/00
    USPC ........................................................ 434/219
    See application file for complete search history.

(56) References Cited

U.S. PATENT DOCUMENTS

| 4,337,048 | A | * | 6/1982 | Hatch et al. .................... 434/219 |
| 4,776,798 | A | * | 10/1988 | Crawford ...................... 434/224 |
| 5,752,835 | A | | 5/1998 | Whitmer, Sr. |
| 6,048,208 | A | * | 4/2000 | Hoover ......................... 434/224 |
| 6,064,940 | A | * | 5/2000 | Rodgers et al. ............... 701/408 |
| 6,140,819 | A | * | 10/2000 | Peterman et al. ............. 324/326 |
| 6,339,969 | B1 | * | 1/2002 | Salcudean et al. ......... 74/490.05 |
| 6,799,975 | B1 | * | 10/2004 | Dunn ............................ 434/365 |
| 6,866,513 | B2 | | 3/2005 | Hough |
| 6,944,596 | B1 | * | 9/2005 | Gray et al. .................... 705/321 |
| 6,983,036 | B2 | | 1/2006 | Esty |
| 6,999,021 | B2 | * | 2/2006 | Taylor et al. .................... 342/22 |
| 7,640,105 | B2 | | 12/2009 | Nielsen et al. |
| 8,060,304 | B2 | | 11/2011 | Nielsen et al. |
| 8,155,390 | B2 | | 4/2012 | Nielsen et al. |
| 8,194,932 | B2 | | 6/2012 | Nielsen et al. |

(Continued)

OTHER PUBLICATIONS

International Search Report and Written Opinion, Application No. PCT/US2010/39145, Aug. 17, 2010.

(Continued)

*Primary Examiner* — Xuan Thai
*Assistant Examiner* — Alvin Carlos

(57) ABSTRACT

Systems for and methods of simulating facilities for use in locate operations training exercises are disclosed. Embodiments of the simulated facilities systems include a floor system in which one or more concealed wires may be energized to simulate underground facilities for the purpose of performing, for example, locate operations training, updating, and/or certification exercises for locate technicians. Embodiments of the simulated facilities systems include configurable pedestals by which either non-electric power line type of facilities and/or electric power line types of facility may be simulated. In some embodiments, simulated facilities systems may be configured manually and/or by use of a system controller.

48 Claims, 14 Drawing Sheets

(56) References Cited

U.S. PATENT DOCUMENTS

| | | |
|---|---|---|
| 8,249,306 B2 | 8/2012 | Nielsen et al. |
| 8,260,489 B2 | 9/2012 | Nielsen et al. |
| 8,265,344 B2 | 9/2012 | Nielsen et al. |
| 8,270,666 B2 | 9/2012 | Nielsen et al. |
| 8,280,117 B2 | 10/2012 | Nielsen et al. |
| 8,280,631 B2 | 10/2012 | Nielsen et al. |
| 8,280,969 B2 | 10/2012 | Nielsen et al. |
| 8,290,204 B2 | 10/2012 | Nielsen et al. |
| 8,290,215 B2 | 10/2012 | Nielsen et al. |
| 8,296,308 B2 | 10/2012 | Nielsen et al. |
| 8,300,895 B2 | 10/2012 | Nielsen et al. |
| 8,301,380 B2 | 10/2012 | Nielsen et al. |
| 8,311,765 B2 | 11/2012 | Nielsen et al. |
| 8,463,487 B2 | 6/2013 | Nielsen et al. |
| 8,467,932 B2 | 6/2013 | Nielsen et al. |
| 2003/0028676 A1 | 2/2003 | Pangrac |
| 2006/0073464 A1 | 4/2006 | Baldus |
| 2006/0077095 A1 | 4/2006 | Tucker et al. |
| 2006/0199165 A1* | 9/2006 | Crowhurst et al. ............ 434/350 |
| 2007/0024527 A1 | 2/2007 | Heikkinen et al. |
| 2007/0166667 A1 | 7/2007 | Jones et al. |
| 2008/0009349 A1 | 1/2008 | Wolfe |
| 2008/0180322 A1 | 7/2008 | Islam |
| 2008/0254415 A1* | 10/2008 | Barry .............................. 434/29 |
| 2008/0299534 A1 | 12/2008 | Richardson |
| 2009/0005140 A1 | 1/2009 | Rose et al. |
| 2009/0013928 A1 | 1/2009 | Nielsen et al. |
| 2009/0042173 A1* | 2/2009 | Jaszlics et al. ................ 434/219 |
| 2009/0201178 A1 | 8/2009 | Nielsen et al. |
| 2009/0201311 A1 | 8/2009 | Nielsen et al. |
| 2009/0202101 A1 | 8/2009 | Nielsen et al. |
| 2009/0202110 A1 | 8/2009 | Nielsen et al. |
| 2009/0202111 A1 | 8/2009 | Nielsen et al. |
| 2009/0204238 A1 | 8/2009 | Nielsen et al. |
| 2009/0204466 A1 | 8/2009 | Nielsen et al. |
| 2009/0207019 A1 | 8/2009 | Nielsen et al. |
| 2009/0208642 A1 | 8/2009 | Nielsen et al. |
| 2009/0210098 A1 | 8/2009 | Nielsen et al. |
| 2009/0210284 A1 | 8/2009 | Nielsen et al. |
| 2009/0210285 A1 | 8/2009 | Nielsen et al. |
| 2009/0210298 A1 | 8/2009 | Nielsen et al. |
| 2009/0227374 A1 | 9/2009 | Tirpak et al. |
| 2009/0237408 A1 | 9/2009 | Nielsen et al. |
| 2009/0238415 A1 | 9/2009 | Nielsen et al. |
| 2009/0324815 A1 | 12/2009 | Nielsen et al. |
| 2009/0327024 A1 | 12/2009 | Nielsen et al. |
| 2010/0006667 A1 | 1/2010 | Nielsen et al. |
| 2010/0010862 A1 | 1/2010 | Nielsen et al. |
| 2010/0010863 A1 | 1/2010 | Nielsen et al. |
| 2010/0010882 A1 | 1/2010 | Nielsen et al. |
| 2010/0010883 A1 | 1/2010 | Nielsen et al. |
| 2010/0084532 A1 | 4/2010 | Nielsen et al. |
| 2010/0085376 A1 | 4/2010 | Nielsen et al. |
| 2010/0085694 A1 | 4/2010 | Nielsen et al. |
| 2010/0085701 A1 | 4/2010 | Nielsen et al. |
| 2010/0086671 A1 | 4/2010 | Nielsen et al. |
| 2010/0088031 A1 | 4/2010 | Nielsen et al. |
| 2010/0088032 A1 | 4/2010 | Nielsen et al. |
| 2010/0088134 A1 | 4/2010 | Nielsen et al. |
| 2010/0088135 A1 | 4/2010 | Nielsen et al. |
| 2010/0088164 A1 | 4/2010 | Nielsen et al. |
| 2010/0090700 A1 | 4/2010 | Nielsen et al. |
| 2010/0090858 A1 | 4/2010 | Nielsen et al. |
| 2010/0094553 A1 | 4/2010 | Nielsen et al. |
| 2010/0117654 A1 | 5/2010 | Nielsen et al. |
| 2010/0125622 A1 | 5/2010 | White et al. |
| 2010/0188088 A1 | 7/2010 | Nielsen et al. |
| 2010/0188215 A1 | 7/2010 | Nielsen et al. |
| 2010/0188216 A1 | 7/2010 | Nielsen et al. |
| 2010/0188245 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0201706 A1 | 8/2010 | Nielsen et al. |
| 2010/0205031 A1 | 8/2010 | Nielsen et al. |
| 2010/0205032 A1 | 8/2010 | Nielsen et al. |
| 2010/0205264 A1 | 8/2010 | Nielsen et al. |
| 2010/0205536 A1 | 8/2010 | Nielsen et al. |
| 2010/0205554 A1 | 8/2010 | Nielsen et al. |
| 2010/0205555 A1 | 8/2010 | Nielsen et al. |
| 2010/0228588 A1 | 9/2010 | Nielsen et al. |
| 2010/0245086 A1 | 9/2010 | Nielsen et al. |
| 2010/0247754 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0255182 A1 | 10/2010 | Nielsen et al. |
| 2010/0256825 A1 | 10/2010 | Nielsen et al. |
| 2010/0256912 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0259381 A1 | 10/2010 | Nielsen et al. |
| 2010/0259414 A1 | 10/2010 | Nielsen et al. |
| 2010/0262470 A1 | 10/2010 | Nielsen et al. |
| 2010/0262670 A1 | 10/2010 | Nielsen et al. |
| 2010/0263591 A1 | 10/2010 | Nielsen et al. |
| 2010/0272885 A1* | 10/2010 | Olsson et al. ................. 427/137 |
| 2010/0274575 A1 | 10/2010 | Lemke et al. |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2010/0324967 A1 | 12/2010 | Nielsen et al. |
| 2011/0007076 A1 | 1/2011 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0046999 A1 | 2/2011 | Nielsen et al. |
| 2011/0060496 A1 | 3/2011 | Nielsen et al. |
| 2011/0060549 A1 | 3/2011 | Nielsen et al. |
| 2011/0093306 A1 | 4/2011 | Nielsen et al. |
| 2011/0095885 A9 | 4/2011 | Nielsen et al. |
| 2011/0117272 A1 | 5/2011 | Nielsen et al. |
| 2011/0131081 A1 | 6/2011 | Nielsen et al. |
| 2011/0137769 A1 | 6/2011 | Nielsen et al. |
| 2011/0236588 A1 | 9/2011 | Nielsen et al. |
| 2011/0249394 A1 | 10/2011 | Nielsen et al. |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0066506 A1 | 3/2012 | Nielsen et al. |
| 2012/0069178 A1 | 3/2012 | Nielsen et al. |
| 2012/0072035 A1 | 3/2012 | Nielsen et al. |
| 2012/0110019 A1 | 5/2012 | Nielsen et al. |
| 2012/0113244 A1 | 5/2012 | Nielsen et al. |
| 2012/0274476 A1 | 11/2012 | Nielsen et al. |
| 2012/0328162 A1 | 12/2012 | Nielsen et al. |
| 2012/0330849 A1 | 12/2012 | Nielsen et al. |
| 2013/0002854 A1 | 1/2013 | Nielsen et al. |
| 2013/0006718 A1 | 1/2013 | Nielsen et al. |
| 2013/0044918 A1 | 2/2013 | Nielsen et al. |
| 2013/0085670 A1 | 4/2013 | Nielsen et al. |
| 2013/0101180 A1 | 4/2013 | Nielsen et al. |

(56) References Cited

U.S. PATENT DOCUMENTS

| | | |
|---|---|---|
| 2013/0103318 A1 | 4/2013 | Nielsen et al. |
| 2013/0116855 A1 | 5/2013 | Nielsen et al. |
| 2013/0125042 A1 | 5/2013 | Nielsen et al. |
| 2013/0135343 A1 | 5/2013 | Nielsen et al. |

OTHER PUBLICATIONS

Co-pending U.S. Publication No. 2011-0020776, filed Jun. 25, 2010.
Hartman et al., "New Training Tools: Enhancing Mine Detection Performance," The Role of the Military in Mine Action, Jun. 2004, pp. 1-8.
Herman et al., "Training and Performance Assessment of Landmine Detector Operator," Detection and Remediation Technologies (2000), pp. 1-12.
http://web.archive.org/web/20081006050128/http://www.wherigo.com/about.aspx, Wayback Machine date of Oct. 6, 2008, 2 pages.
Schweitzer et al., "Optimization of Army-Navy Portable Special Search," Army Research Laboratory, Oct. 2006, pp. 1-78.
Office Action dated Jun. 4, 2013 from Canadian Application No. 2,768,738.
Patent Examination Report No. 1, Australian Application No. 2010263084, Jun. 21, 2013.
Metwaly, et al., "Detection of metallic and plastic landmines using GPR and 2-D relativistic techniques," Natural Hazards and Earth System Sciences, 7, 755-63, 2007.
Office Action dated Jul. 16, 2013 from U.S. Appl. No. 12/823,498.
Sprite Backup Premium 3.14 for Windows Mobile Pocket PCs and Pocket PC Phones, Jun. 2005; downloaded from http://web.archive.org/web/2005070508025/http://www.mobiletechreview.com/software/Sprite-Backup.htm on Jul. 1, 2013, Wayback machine date of Jul. 5, 2005.

\* cited by examiner

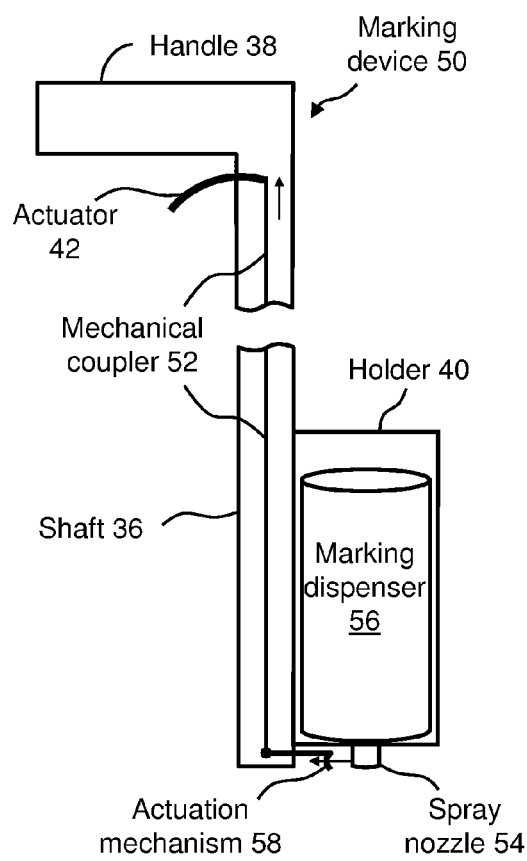 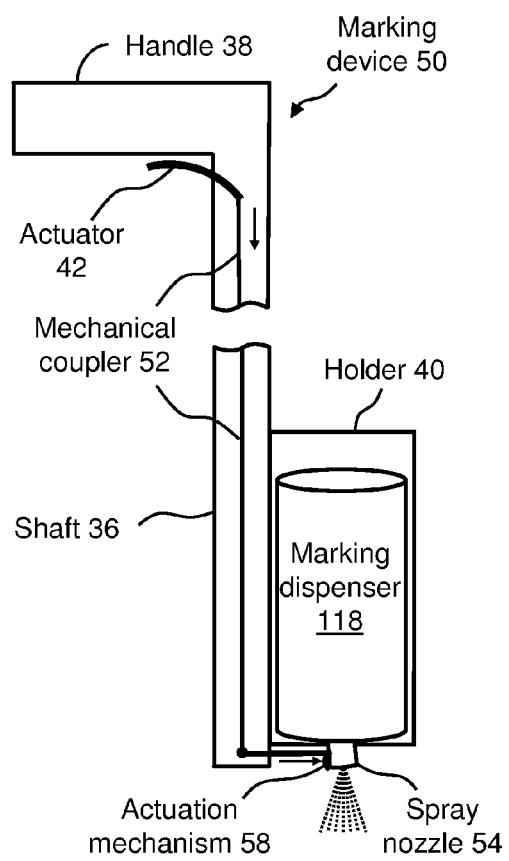
FIG. 1A
(Prior Art)
FIG. 1B
(Prior Art)

(Cross section along line AA of FIG. 2)

SYSTEMS FOR AND METHODS OF SIMULATING FACILITIES FOR USE IN LOCATE OPERATIONS TRAINING EXERCISES

CROSS REFERENCE TO RELATED APPLICATIONS

This application claims priority under 35 U.S.C. §119(e) to U.S. Provisional Application Ser. No. 61/220,262, entitled "Systems For and Methods of Simulating Facilities for Use in Locate Operations Training Exercises," filed Jun. 25, 2009, and to U.S. Provisional Application Ser. No. 61/220,271, entitled "Mobile Systems For and Methods of Simulating Facilities for Use in Locate Operations Training Exercises," filed Jun. 25, 2009, which are hereby incorporated by reference in their entirety.

TECHNICAL FIELD

The present invention relates generally to the field of processes for training underground facility locate technicians. In particular, the present invention is directed to systems for and methods of simulating facilities for use in locate operations training exercises.

BACKGROUND

Field service operations may be any operation in which companies dispatch technicians and/or other staff to perform certain activities, for example, installations, services and/or repairs. Field service operations may exist in various industries, examples of which include, but are not limited to, network installations, utility installations, security systems, construction, medical equipment, heating, ventilating and air conditioning (HVAC) and the like.

An example of a field service operation in the construction industry is a so-called "locate and marking operation," also commonly referred to more simply as a "locate operation" (or sometimes merely as "a locate"). In a typical locate operation, a locate technician visits a work site in which there is a plan to disturb the ground (e.g., excavate, dig one or more holes and/or trenches, bore, etc.) so as to determine a presence or an absence of one or more underground facilities (such as various types of utility cables and pipes) in a dig area to be excavated or disturbed at the work site. In some instances, a locate operation may be requested for a "design" project, in which there may be no immediate plan to excavate or otherwise disturb the ground, but nonetheless information about a presence or absence of one or more underground facilities at a work site may be valuable to inform a planning, permitting and/or engineering design phase of a future construction project.

In many states, an excavator who plans to disturb ground at a work site is required by law to notify any potentially affected underground facility owners prior to undertaking an excavation activity. Advanced notice of excavation activities may be provided by an excavator (or another party) by contacting a "one-call center." One-call centers typically are operated by a consortium of underground facility owners for the purposes of receiving excavation notices and in turn notifying facility owners and/or their agents of a plan to excavate. As part of an advanced notification, excavators typically provide to the one-call center various information relating to the planned activity, including a location (e.g., address) of the work site and a description of the dig area to be excavated or otherwise disturbed at the work site.

A locate operation is initiated as a result of an excavator providing an excavation notice to a one-call center. An excavation notice also is commonly referred to as a "locate request," and may be provided by the excavator to the one-call center via an electronic mail message, information entry via a website maintained by the one-call center, or a telephone conversation between the excavator and a human operator at the one-call center. The locate request may include an address or some other location-related information describing the geographic location of a work site at which the excavation is to be performed, as well as a description of the dig area (e.g., a text description), such as its location relative to certain landmarks and/or its approximate dimensions, within which there is a plan to disturb the ground at the work site. One-call centers similarly may receive locate requests for design projects (for which, as discussed above, there may be no immediate plan to excavate or otherwise disturb the ground).

Once facilities implicated by the locate request are identified by a one-call center, the one-call center generates a "locate request ticket" (also known as a "locate ticket," or simply a "ticket"). The locate request ticket essentially constitutes an instruction to inspect a work site and typically identifies the work site of the proposed excavation or design and a description of the dig area, typically lists on the ticket all of the underground facilities that may be present at the work site (e.g., by providing a member code for the facility owner of an underground facility), and may also include various other information relevant to the proposed excavation or design (e.g., the name of the excavation company, a name of a property owner or party contracting the excavation company to perform the excavation, etc.). The one-call center sends the ticket to one or more underground facility owners and/or one or more locate service providers (who may be acting as contracted agents of the facility owners) so that they can conduct a locate and marking operation to verify a presence or absence of the underground facilities in the dig area. For example, in some instances, a given underground facility owner may operate its own fleet of locate technicians, in which case the one-call center may send the ticket to the underground facility owner. In other instances, a given facility owner may contract with a locate service provider to receive locate request tickets and perform a locate and marking operation in response to received tickets on their behalf.

Upon receiving the locate request, a locate service provider or a facility owner (hereafter referred to as a "ticket recipient") may dispatch a locate technician to the work site of planned excavation to determine a presence or absence of one or more underground facilities in the dig area to be excavated or otherwise disturbed. A typical first step for the locate technician includes utilizing an underground facility "locate device," which is an instrument or set of instruments (also referred to commonly as a "locate set") for detecting facilities that are concealed in some manner, such as cables and pipes that are located underground. The locate device is employed by the technician to verify the presence or absence of underground facilities indicated in the locate request ticket as potentially present in the dig area (e.g., via the facility owner member codes listed in the ticket). This process is often referred to as a "locate operation."

In one example of a locate operation, an underground facility locate device is used to detect electromagnetic fields that are generated by an applied signal provided along a length of a target facility to be identified. In this example, a locate device may include both a signal transmitter to provide the applied signal (e.g., which is coupled by the locate technician to a tracer wire disposed along a length of a facility), and a signal receiver which is generally a hand-held apparatus carried by the locate technician as the technician walks around the dig area to search for underground facilities. The transmitter is connected, via a connection point, to a target object located in the ground. The transmitter generates the applied signal, which is coupled to the underground facility via the connection point (e.g., to a tracer wire along the facility), resulting in the generation of a magnetic field. The magnetic field in turn is detected by the locate receiver, which itself may include at least one detection antenna. The locate receiver indicates a presence of a facility when it detects electromagnetic fields arising from the applied signal. Conversely, the absence of a signal detected by the locate receiver generally indicates the absence of the target facility.

In yet another example, a locate device employed for a locate operation may include a single instrument, similar in some respects to a conventional metal detector. In particular, such an instrument may include an oscillator to generate an alternating current that passes through a coil, which in turn produces a first magnetic field. If a piece of electrically conductive metal is in close proximity to the coil (e.g., if an underground facility having a metal component is below/near the coil of the instrument), eddy currents are induced in the metal and the metal produces its own magnetic field, which in turn affects the first magnetic field. The instrument may include a second coil to measure changes to the first magnetic field, thereby facilitating detection of metallic objects.

In addition to the locate operation, the locate technician also generally performs a "marking operation," in which the technician marks the presence (and in some cases the absence) of a given underground facility in the dig area based on the various signals detected (or not detected) during the locate operation. For this purpose, the locate technician conventionally utilizes a "marking device" to dispense a marking material on, for example, the ground, pavement, or other surface along a detected underground facility. Marking material may be any material, substance, compound, and/or element, used or which may be used separately or in combination to mark, signify, and/or indicate. Examples of marking materials may include, but are not limited to, paint, chalk, dye, and/or iron. Marking devices, such as paint marking wands and/or paint marking wheels, provide a convenient method of dispensing marking materials onto surfaces, such as onto the surface of the ground or pavement.

FIGS. 1A and 1B illustrate a conventional marking device 50 with a mechanical actuation system to dispense paint as a marker. Generally speaking, the marking device 50 includes a handle 38 at a proximal end of an elongated shaft 36 and resembles a sort of "walking stick," such that a technician may operate the marking device while standing/walking in an upright or substantially upright position. A marking dispenser holder 40 is coupled to a distal end of the shaft 36 so as to contain and support a marking dispenser 56, e.g., an aerosol paint can having a spray nozzle 54. Typically, a marking dispenser in the form of an aerosol paint can is placed into the holder 40 upside down, such that the spray nozzle 54 is proximate to the distal end of the shaft (close to the ground, pavement or other surface on which markers are to be dispensed).

In FIGS. 1A and 1B, the mechanical actuation system of the marking device 50 includes an actuator or mechanical trigger 42 proximate to the handle 38 that is actuated/triggered by the technician (e.g., via pulling, depressing or squeezing with fingers/hand). The actuator 42 is connected to a mechanical coupler 52 (e.g., a rod) disposed inside and along a length of the elongated shaft 36. The coupler 52 is in turn connected to an actuation mechanism 58, at the distal end of the shaft 36, which mechanism extends outward from the shaft in the direction of the spray nozzle 54. Thus, the actuator 42, the mechanical coupler 52, and the actuation mechanism 58 constitute the mechanical actuation system of the marking device 50.

FIG. 1A shows the mechanical actuation system of the conventional marking device 50 in the non-actuated state, wherein the actuator 42 is "at rest" (not being pulled) and, as a result, the actuation mechanism 58 is not in contact with the spray nozzle 54. FIG. 1B shows the marking device 50 in the actuated state, wherein the actuator 42 is being actuated (pulled, depressed, squeezed) by the technician. When actuated, the actuator 42 displaces the mechanical coupler 52 and the actuation mechanism 58 such that the actuation mechanism contacts and applies pressure to the spray nozzle 54, thus causing the spray nozzle to deflect slightly and dispense paint. The mechanical actuation system is spring-loaded so that it automatically returns to the non-actuated state (FIG. 1A) when the actuator 42 is released.

In some environments, arrows, flags, darts, or other types of physical marks may be used to mark the presence or absence of an underground facility in a dig area, in addition to or as an alternative to a material applied to the ground (such as paint, chalk, dye, tape) along the path of a detected utility. The marks resulting from any of a wide variety of materials and/or objects used to indicate a presence or absence of underground facilities generally are referred to as "locate marks." Often, different color materials and/or physical objects may be used for locate marks, wherein different colors correspond to different utility types. For example, the American Public Works Association (APWA) has established a standardized color-coding system for utility identification for use by public agencies, utilities, contractors and various groups involved in ground excavation (e.g., red=electric power lines and cables; blue=potable water; orange=telecommunication lines; yellow=gas, oil, steam). In some cases, the technician also may provide one or more marks to indicate that no facility was found in the dig area (sometimes referred to as a "clear").

As mentioned above, the foregoing activity of identifying and marking a presence or absence of one or more underground facilities generally is referred to for completeness as a "locate and marking operation." However, in light of common parlance adopted in the construction industry, and/or for the sake of brevity, one or both of the respective locate and marking functions may be referred to in some instances simply as a "locate operation" or a "locate" (i.e., without making any specific reference to the marking function). Accordingly, it should be appreciated that any reference in the relevant arts to the task of a locate technician simply as a "locate operation" or a "locate" does not necessarily exclude the marking portion of the overall process. At the same time, in some contexts a locate operation is identified separately from a marking operation, wherein the former relates more specifically to detection-related activities and the latter relates more specifically to marking-related activities.

Inaccurate locating and/or marking of underground facilities can result in physical damage to the facilities, property damage, and/or personal injury during the excavation process that, in turn, can expose a facility owner or contractor to significant legal liability. When underground facilities are damaged and/or when property damage or personal injury results from damaging an underground facility during an excavation, the excavator may assert that the facility was not accurately located and/or marked by a locate technician, while the locate contractor who dispatched the technician may in turn assert that the facility was indeed properly located and marked. Proving whether the underground facility was properly located and marked can be difficult after the excavation (or after some damage, e.g., a gas explosion), because in many cases the physical locate marks (e.g., the marking material or other physical marks used to mark the facility on the surface of the dig area) will have been disturbed or destroyed during the excavation process (and/or damage resulting from excavation).

Underground facility locate service providers (hereafter referred to as locate companies) conduct training programs and/or other processes for training newly hired locate technicians and/or updating or certifying the skills of locate technicians. For example, locate companies may conduct training exercises over a period of days and/or weeks. Further, locate companies may provide ongoing training and/or certification exercises for locate technicians due to, for example, changes in policies and/or technology with respect to performing locate operations. These training and/or other processes require planning and resources (i.e., monetary, physical, and/or human resources). As a result, locate companies may have a significant investment with respect to programs and/or other processes for training new locate technicians and/or updating or certifying the skills of locate technicians.

Further, there may be certain inefficiencies and other drawbacks to current training programs and/or other processes for updating or certifying the skills of locate technicians. In one example, the content of the training, updating, and/or certification programs may be inconsistent from one session to another because of different instructors. Consequently, the outcome of the programs may be inconsistent. Therefore, a need exists for improved training, updating, and/or certification processes for locate technicians that provide consistent content and, therefore, provide consistent outcomes, are readily available, low cost, efficient, suitable for providing individual training as well as group training, and so on.

SUMMARY

The present invention relates to systems for and methods of simulating facilities for use in locate operations training exercises. For example, embodiments of simulated facilities systems may be installed in a floor system in which concealed wires may be installed at different depths relative to the marking surface thereof, and the wires may be energized with a detection signal in order to simulate underground facilities during locate operations. The parameters of the detection signal along the concealed wires may be adjustable in order to simulate different attributes (e.g., type and length) of underground facilities. In some embodiments, the surface of the floor system of the simulated facilities systems is reusable with respect to dispensing marking material thereon during, for example, locate operations training, updating, and/or certification exercises for locate technicians.

In some embodiments, the floor system is configured for indoor use, such as in a locate company facility. In further embodiments, the floor system is configured for outdoor use, such as in a parking lot or adjacent to a locate company facility, and may be weatherproof. In additional embodiments, the floor system is configured for installation in mobile environments, such as, but not limited to, a semi-trailer truck or other vehicle.

In other embodiments, a lighting array that is installed in the floor system in combination with a specially equipped marking device is provided to indicate marks without dispensing actual marking material.

In further embodiments, the paths of the concealed wires that may be energized with a detection signal in order to simulate underground facilities during locate operations may be programmable.

In one embodiment of the present invention, a simulated facilities system to simulate underground facilities comprises a floor system configured to define a simulated dig area, the floor system including a simulated marking surface to permit location and marking of simulated facilities, and one or more simulated facilities concealed in the floor system below the marking surface; and a system controller including one or more locate routines to control configuration and operation of the simulated facilities.

In another embodiment, a method for simulating underground facilities comprises providing a floor system configured to define a simulated dig area, the floor system including a simulated marking surface to permit location and marking of simulated facilities, and one or more simulated facilities concealed in the floor system below the marking surface; controlling the configuration and operation of the simulated facilities to define a facility locate routine; and performing location and marking of the simulated facilities according to the defined facility locate routine.

In another embodiment, a method for facility locate training comprises providing a floor system configured to define a simulated dig area, the floor system including a simulated marking surface to permit location and marking of simulated facilities, and one or more simulated facilities concealed in the floor system below the marking surface; configuring the simulated facilities to define a facility locate routine; performing, by a user, simulated location and marking operations in accordance with the defined facility locate routine; evaluating the simulated location and marking operations; and coaching the user based on the evaluation of the simulated location and marking operations.

In another embodiment, a floor system to simulate underground facilities in a simulated dig area comprises a simulated marking surface to permit location and marking of simulated facilities in the simulated dig area; and one or more simulated facilities concealed in the floor system below the marking surface.

In another embodiment, a mobile simulated facilities system to simulate underground facilities comprises a floor system configured to be carried in a vehicle and to define a simulated dig area, the floor system including a simulated marking surface to permit location and marking of simulated facilities, and one or more simulated facilities concealed in the floor system below the marking surface; and a system controller including one or more locate routines to control configuration and operation of the simulated facilities.

In another embodiment, a method for simulating underground facilities comprises providing a floor system configured to be carried in a vehicle and to define a simulated dig area, the floor system including a simulated marking surface to permit location and marking of simulated facilities, and one or more simulated facilities concealed in the floor system below the marking surface; transporting the floor system in the vehicle; controlling the configuration and operation of the simulated facilities to define a facility locate routine; and performing location and marking of the simulated facilities according to the defined facility locate routine.

In another embodiment, a method for facility locate training comprises providing a floor system configured to be carried in a vehicle and to define a simulated dig area, the floor system including a simulated marking surface to permit location and marking of simulated facilities, and one or more simulated facilities concealed in the floor system below the marking surface; transporting the floor system in the vehicle; configuring the simulated facilities to define a facility locate routine; performing, by a user, simulated location and marking operations in accordance with the defined facility locate routine; evaluating the simulated location and marking operations; and coaching the user based on the evaluation of the simulated location and marking operations.

In another embodiment, a mobile floor system to simulate underground facilities in a simulated dig area comprises a simulated marking surface to permit location and marking of simulated facilities in the simulated dig area; and one or more simulated facilities concealed in the mobile floor system below the marking surface, the mobile floor system configured to be carried in a vehicle.

In another embodiment, a mobile simulated facilities system to simulate underground facilities comprises a vehicle including a trailer; a floor system configured to be carried in the trailer and to define a simulated dig area, the floor system including a simulated marking surface to permit location and marking of simulated facilities, and one or more simulated facilities concealed in the floor system below the marking surface; and a system controller including one or more locate routines to control configuration and operation of the simulated facilities.

Glossary:

For purposes of the present disclosure, the term "dig area" refers to a specified area of a work site within which there is a plan to disturb the ground (e.g., excavate, dig holes and/or trenches, bore, etc.), and beyond which there is no plan to excavate in the immediate surroundings. Thus, the metes and bounds of a dig area are intended to provide specificity as to where some disturbance to the ground is planned at a given work site. It should be appreciated that a given work site may include multiple dig areas.

The term "facility" refers to one or more lines, cables, fibers, conduits, transmitters, receivers, or other physical objects or structures capable of or used for carrying, transmitting, receiving, storing, and providing utilities, energy, data, substances, and/or services, and/or any combination thereof. The term "underground facility" means any facility beneath the surface of the ground. Examples of facilities include, but are not limited to, oil, gas, water, sewer, power, telephone, data transmission, cable television (TV), and/or internet services.

The term "locate device" refers to any apparatus and/or device for detecting and/or inferring the presence or absence of any facility, including without limitation, any underground facility. In various examples, a locate device may include both a locate transmitter and a locate receiver (which in some instances may also be referred to collectively as a "locate instrument set," or simply "locate set").

The term "marking device" refers to any apparatus, mechanism, or other device that employs a marking dispenser for causing a marking material and/or marking object to be dispensed, or any apparatus, mechanism, or other device for electronically indicating (e.g., logging in memory) a location, such as a location of an underground facility. Additionally, the term "marking dispenser" refers to any apparatus, mechanism, or other device for dispensing and/or otherwise using, separately or in combination, a marking material and/or a marking object. An example of a marking dispenser may include, but is not limited to, a pressurized can of marking paint. The term "marking material" means any material, substance, compound, and/or element, used or which may be used separately or in combination to mark, signify, and/or indicate. Examples of marking materials may include, but are not limited to, paint, chalk, dye, and/or iron. The term "marking object" means any object and/or objects used or which may be used separately or in combination to mark, signify, and/or indicate. Examples of marking objects may include, but are not limited to, a flag, a dart, and arrow, and/or an RFID marking ball. It is contemplated that marking material may include marking objects. It is further contemplated that the terms "marking materials" or "marking objects" may be used interchangeably in accordance with the present disclosure.

The term "locate mark" means any mark, sign, and/or object employed to indicate the presence or absence of any underground facility. Examples of locate marks may include, but are not limited to, marks made with marking materials, marking objects, global positioning or other information, and/or any other means. Locate marks may be represented in any form including, without limitation, physical, visible, electronic, and/or any combination thereof.

The terms "actuate" or "trigger" (verb form) are used interchangeably to refer to starting or causing any device, program, system, and/or any combination thereof to work, operate, and/or function in response to some type of signal or stimulus. Examples of actuation signals or stimuli may include, but are not limited to, any local or remote, physical, audible, inaudible, visual, non-visual, electronic, mechanical, electromechanical, biomechanical, biosensing or other signal, instruction, or event. The terms "actuator" or "trigger" (noun form) are used interchangeably to refer to any method or device used to generate one or more signals or stimuli to cause or causing actuation. Examples of an actuator/trigger may include, but are not limited to, any form or combination of a lever, switch, program, processor, screen, microphone for capturing audible commands, and/or other device or method. An actuator/trigger may also include, but is not limited to, a device, software, or program that responds to any movement and/or condition of a user, such as, but not limited to, eye movement, brain activity, heart rate, other data, and/or the like, and generates one or more signals or stimuli in response thereto. In the case of a marking device or other marking mechanism (e.g., to physically or electronically mark a facility or other feature), actuation may cause marking material to be dispensed, as well as various data relating to the marking operation (e.g., geographic location, time stamps, characteristics of material dispensed, etc.) to be logged in an electronic file stored in memory. In the case of a locate device or other locate mechanism (e.g., to physically locate a facility or other feature), actuation may cause a detected signal strength, signal frequency, depth, or other information relating to the locate operation to be logged in an electronic file stored in memory.

The terms "locate and marking operation," "locate operation," and "locate" generally are used interchangeably and refer to any activity to detect, infer, and/or mark the presence or absence of an underground facility. In some contexts, the term "locate operation" is used to more specifically refer to detection of one or more underground facilities, and the term "marking operation" is used to more specifically refer to using a marking material and/or one or more marking objects to mark a presence or an absence of one or more underground facilities. The term "locate technician" refers to an individual performing a locate operation. A locate and marking operation often is specified in connection with a dig area, at least a portion of which may be excavated or otherwise disturbed during excavation activities.

The term "user" refers to an individual utilizing a locate device and/or a marking device and may include, but is not limited to, land surveyors, locate technicians, and support personnel.

The terms "locate request" and "excavation notice" are used interchangeably to refer to any communication to request a locate and marking operation. The term "locate request ticket" (or simply "ticket") refers to any communication or instruction to perform a locate operation. A ticket might specify, for example, the address or description of a dig area to be marked, the day and/or time that the dig area is to be marked, and/or whether the user is to mark the excavation area for certain gas, water, sewer, power, telephone, cable television, and/or some other underground facility. The term "historical ticket" refers to past tickets that have been completed.

The following U.S. published applications are hereby incorporated herein by reference:

U.S. Pat. No. 7,640,105, issued Dec. 29, 2009, filed Mar. 13, 2007, and entitled "Marking System and Method With Location and/or Time Tracking;"

U.S. publication no. 2010-0094553-A1, published Apr. 15, 2010, filed Dec. 16, 2009, and entitled "Systems and Methods for Using Location Data and/or Time Data to Electronically Display Dispensing of Markers by A Marking System or Marking Tool;"

U.S. publication no. 2008-0245299-A1, published Oct. 9, 2008, filed Apr. 4, 2007, and entitled "Marking System and Method;"

U.S. publication no. 2009-0013928-A1, published Jan. 15, 2009, filed Sep. 24, 2008, and entitled "Marking System and Method;"

U.S. publication no. 2010-0090858-A1, published Apr. 15, 2010, filed Dec. 16, 2009, and entitled "Systems and Methods for Using Marking Information to Electronically Display Dispensing of Markers by a Marking System or Marking Tool;"

U.S. publication no. 2009-0238414-A1, published Sep. 24, 2009, filed Mar. 18, 2008, and entitled "Virtual White Lines for Delimiting Planned Excavation Sites;"

U.S. publication no. 2009-0241045-A1, published Sep. 24, 2009, filed Sep. 26, 2008, and entitled "Virtual White Lines for Delimiting Planned Excavation Sites;"

U.S. publication no. 2009-0238415-A1, published Sep. 24, 2009, filed Sep. 26, 2008, and entitled "Virtual White Lines for Delimiting Planned Excavation Sites;"

U.S. publication no. 2009-0241046-A1, published Sep. 24, 2009, filed Jan. 16, 2009, and entitled "Virtual White Lines for Delimiting Planned Excavation Sites;"

U.S. publication no. 2009-0238416-A1, published Sep. 24, 2009, filed Jan. 16, 2009, and entitled "Virtual White Lines for Delimiting Planned Excavation Sites;"

U.S. publication no. 2009-0237408-A1, published Sep. 24, 2009, filed Jan. 16, 2009, and entitled "Virtual White Lines for Delimiting Planned Excavation Sites;"

U.S. publication no. 2009-0202101-A1, published Aug. 13, 2009, filed Feb. 12, 2008, and entitled "Electronic Manifest of Underground Facility Locate Marks;"

U.S. publication no. 2009-0202110-A1, published Aug. 13, 2009, filed Sep. 11, 2008, and entitled "Electronic Manifest of Underground Facility Locate Marks;"

U.S. publication no. 2009-0201311-A1, published Aug. 13, 2009, filed Jan. 30, 2009, and entitled "Electronic Manifest of Underground Facility Locate Marks;"

U.S. publication no. 2009-0202111-A1, published Aug. 13, 2009, filed Jan. 30, 2009, and entitled "Electronic Manifest of Underground Facility Locate Marks;"

U.S. publication no. 2009-0204625-A1, published Aug. 13, 2009, filed Feb. 5, 2009, and entitled "Electronic Manifest of Underground Facility Locate Operation;"

U.S. publication no. 2009-0204466-A1, published Aug. 13, 2009, filed Sep. 4, 2008, and entitled "Ticket Approval System For and Method of Performing Quality Control In Field Service Applications;"

U.S. publication no. 2009-0207019-A1, published Aug. 20, 2009, filed Apr. 30, 2009, and entitled "Ticket Approval System For and Method of Performing Quality Control In Field Service Applications;"

U.S. publication no. 2009-0210284-A1, published Aug. 20, 2009, filed Apr. 30, 2009, and entitled "Ticket Approval System For and Method of Performing Quality Control In Field Service Applications;"

U.S. publication no. 2009-0210297-A1, published Aug. 20, 2009, filed Apr. 30, 2009, and entitled "Ticket Approval System For and Method of Performing Quality Control In Field Service Applications;"

U.S. publication no. 2009-0210298-A1, published Aug. 20, 2009, filed Apr. 30, 2009, and entitled "Ticket Approval System For and Method of Performing Quality Control In Field Service Applications;"

U.S. publication no. 2009-0210285-A1, published Aug. 20, 2009, filed Apr. 30, 2009, and entitled "Ticket Approval System For and Method of Performing Quality Control In Field Service Applications;"

U.S. publication no. 2009-0324815-A1, published Dec. 31, 2009, filed Apr. 24, 2009, and entitled "Marking Apparatus and Marking Methods Using Marking Dispenser with Machine-Readable ID Mechanism;"

U.S. publication no. 2010-0006667-A1, published Jan. 14, 2010, filed Apr. 24, 2009, and entitled, "Marker Detection Mechanisms for use in Marking Devices And Methods of Using Same;"

U.S. publication no. 2010-0085694 A1, published Apr. 8, 2010, filed Sep. 30, 2009, and entitled, "Marking Device Docking Stations and Methods of Using Same;"

U.S. publication no. 2010-0085701 A1, published Apr. 8, 2010, filed Sep. 30, 2009, and entitled, "Marking Device Docking Stations Having Security Features and Methods of Using Same;"

U.S. publication no. 2010-0084532 A1, published Apr. 8, 2010, filed Sep. 30, 2009, and entitled, "Marking Device Docking Stations Having Mechanical Docking and Methods of Using Same;"

U.S. publication no. 2010-0088032-A1, published Apr. 8, 2010, filed Sep. 29, 2009, and entitled, "Methods, Apparatus and Systems for Generating Electronic Records of Locate And Marking Operations, and Combined Locate and Marking Apparatus for Same;"

U.S. publication no. 2010-0117654 A1, published May 13, 2010, filed Dec. 30, 2009, and entitled, "Methods and Apparatus for Displaying an Electronic Rendering of a Locate and/or Marking Operation Using Display Layers;"

U.S. publication no. 2010-0086677 A1, published Apr. 8, 2010, filed Aug. 11, 2009, and entitled, "Methods and Apparatus for Generating an Electronic Record of a Marking Operation Including Service-Related Information and Ticket Information;"

U.S. publication no. 2010-0086671 A1, published Apr. 8, 2010, filed Nov. 20, 2009, and entitled, "Methods and Apparatus for Generating an Electronic Record of A Marking Operation Including Service-Related Information and Ticket Information;"

U.S. publication no. 2010-0085376 A1, published Apr. 8, 2010, filed Oct. 28, 2009, and entitled, "Methods and Apparatus for Displaying an Electronic Rendering of a Marking Operation Based on an Electronic Record of Marking Information;"

U.S. publication no. 2010-0088164-A1, published Apr. 8, 2010, filed Sep. 30, 2009, and entitled, "Methods and Apparatus for Analyzing Locate and Marking Operations with Respect to Facilities Maps;"

U.S. publication no. 2010-0088134 A1, published Apr. 8, 2010, filed Oct. 1, 2009, and entitled, "Methods and Apparatus for Analyzing Locate and Marking Operations with Respect to Historical Information;"

U.S. publication no. 2010-0088031 A1, published Apr. 8, 2010, filed Sep. 28, 2009, and entitled, "Methods and Apparatus for Generating an Electronic Record of Environmental Landmarks Based on Marking Device Actuations;"

U.S. publication no. 2009-0204238-A1, published Aug. 13, 2009, filed Feb. 2, 2009, and entitled "Electronically Controlled Marking Apparatus and Methods;"

U.S. publication no. 2009-0208642-A1, published Aug. 20, 2009, filed Feb. 2, 2009, and entitled "Marking Apparatus and Methods For Creating an Electronic Record of Marking Operations;"

U.S. publication no. 2009-0210098-A1, published Aug. 20, 2009, filed Feb. 2, 2009, and entitled "Marking Apparatus and Methods For Creating an Electronic Record of Marking Apparatus Operations;"

U.S. publication no. 2009-0201178-A1, published Aug. 13, 2009, filed Feb. 2, 2009, and entitled "Methods For Evaluating Operation of Marking Apparatus;"

U.S. publication no. 2009-0238417-A1, published Sep. 24, 2009, filed Feb. 6, 2009, and entitled "Virtual White Lines for Indicating Planned Excavation Sites on Electronic Images;"

U.S. publication no. 2009-0202112-A1, published Aug. 13, 2009, filed Feb. 11, 2009, and entitled "Searchable Electronic Records of Underground Facility Locate Marking Operations;"

U.S. publication no. 2009-0204614-A1, published Aug. 13, 2009, filed Feb. 11, 2009, and entitled "Searchable Electronic Records of Underground Facility Locate Marking Operations;"

U.S. publication no. 2009-0327024-A1, published Dec. 31, 2009, filed Jun. 26, 2009, and entitled "Methods and Apparatus for Quality Assessment of a Field Service Operation;"

U.S. publication no. 2010-0010862-A1, published Jan. 14, 2010, filed Aug. 7, 2009, and entitled, "Methods and Apparatus for Quality Assessment of a Field Service Operation Based on Geographic Information;"

U.S. publication No. 2010-0010863-A1, published Jan. 14, 2010, filed Aug. 7, 2009, and entitled, "Methods and Apparatus for Quality Assessment of a Field Service Operation Based on Multiple Scoring Categories;"

U.S. publication no. 2010-0010882-A1, published Jan. 14, 2010, filed Aug. 7, 2009, and entitled, "Methods and Apparatus for Quality Assessment of a Field Service Operation Based on Dynamic Assessment Parameters;"

U.S. publication no. 2010-0010883-A1, published Jan. 14, 2010, filed Aug. 7, 2009, and entitled, "Methods and Apparatus for Quality Assessment of a Field Service Operation Based on Multiple Quality Assessment Criteria;"

U.S. publication no. 2010-0088135 A1, published Apr. 8, 2010, filed Oct. 1, 2009, and entitled, "Methods and Apparatus for Analyzing Locate and Marking Operations with Respect to Environmental Landmarks;"

U.S. publication no. 2010-0085185 A1, published Apr. 8, 2010, filed Sep. 30, 2009, and entitled, "Methods and Apparatus for Generating Electronic Records of Locate Operations;"

U.S. publication no. 2010-0090700-A1, published Apr. 15, 2010, filed Oct. 30, 2009, and entitled "Methods and Apparatus for Displaying an Electronic Rendering of a Locate Operation Based on an Electronic Record of Locate Information;" and U.S. publication no. 2010-0085054 A1, published Apr. 8, 2010, filed Sep. 30, 2009, and entitled, "Systems and Methods for Generating Electronic Records of Locate And Marking Operations."

BRIEF DESCRIPTION OF THE DRAWINGS

The present invention, both as to its organization and manner of operation, together with further objectives and advantages, may be best understood by reference to the following description, taken in connection with the accompanying drawings as set forth below:

FIGS. 1A and 1B illustrate a conventional marking device in non-actuated and actuated states, respectively;

DETAILED DESCRIPTION

The present application describes systems for and methods of simulating facilities for use in locate operations training exercises. For example, embodiments of simulated facilities systems may be installed in a floor system in which concealed wires may be installed at different depths relative to the marking surface thereof, and the wires may be energized with a detection signal in order to simulate underground facilities during locate operations. The parameters of the detection signal along the concealed wires may be adjustable in order to simulate different attributes (e.g., type and length) of underground facilities. In some embodiments, the surface of the floor system of the simulated facilities systems is reusable with respect to dispensing marking material thereon during, for example, locate operations training, updating, and/or certification exercises for locate technicians.

In some embodiments, the floor system is configured for indoor use, such as in a locate company facility. In further embodiments, the floor system is configured for outdoor use, such as in a parking lot or adjacent to a locate company facility, and may be weatherproof. In additional embodiments, the floor system is configured for installation in mobile environments, such as, but not limited to, a semi-trailer truck or other vehicle.

In other embodiments, a lighting array that is installed in the floor system in combination with a specially equipped marking device is provided to indicate marks without dispensing actual marking material.

In yet other embodiments, the paths of the concealed wires that may be energized with a detection signal in order to simulate underground facilities during locate operations may be programmable.

Figure 2:
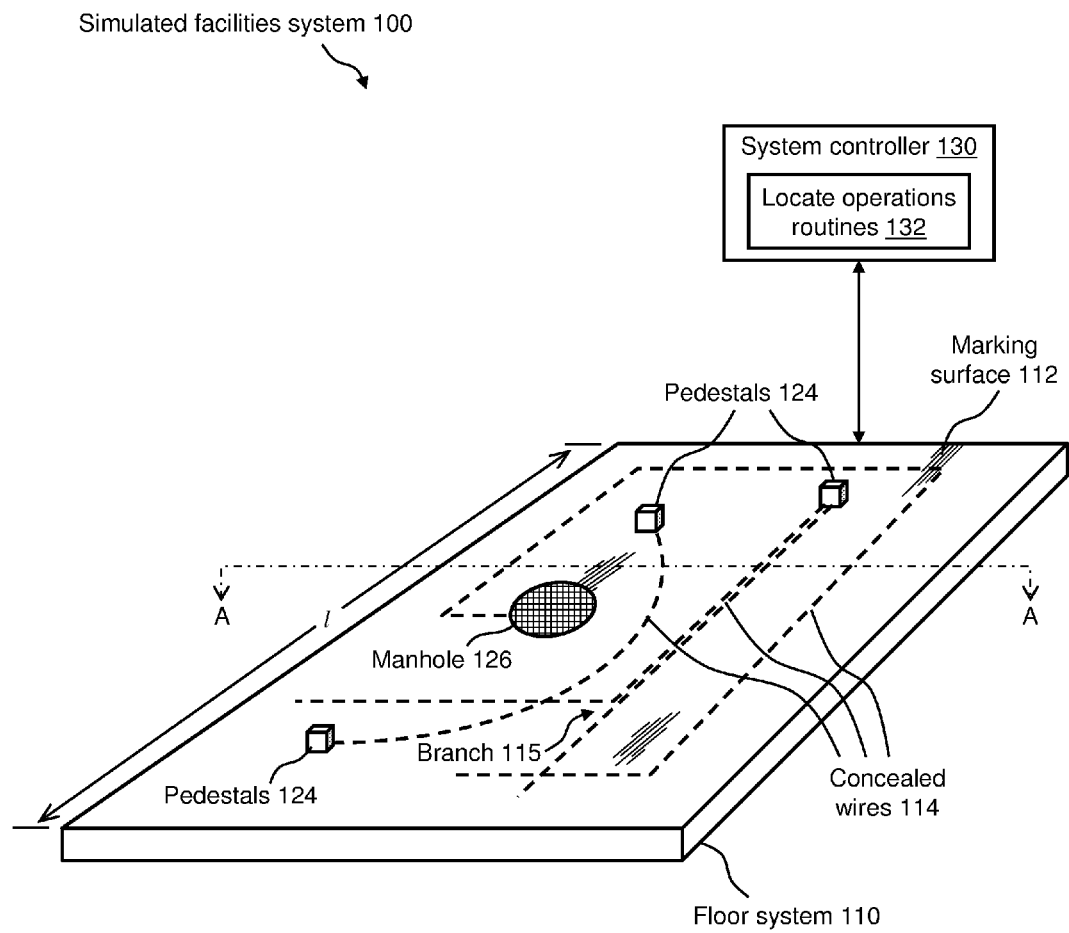
FIG. 2 is a perspective view of an example of a simulated facilities system for use in locate operations training, updating, and/or certification exercises, according to one embodiment of the present invention.
Figure 2A:
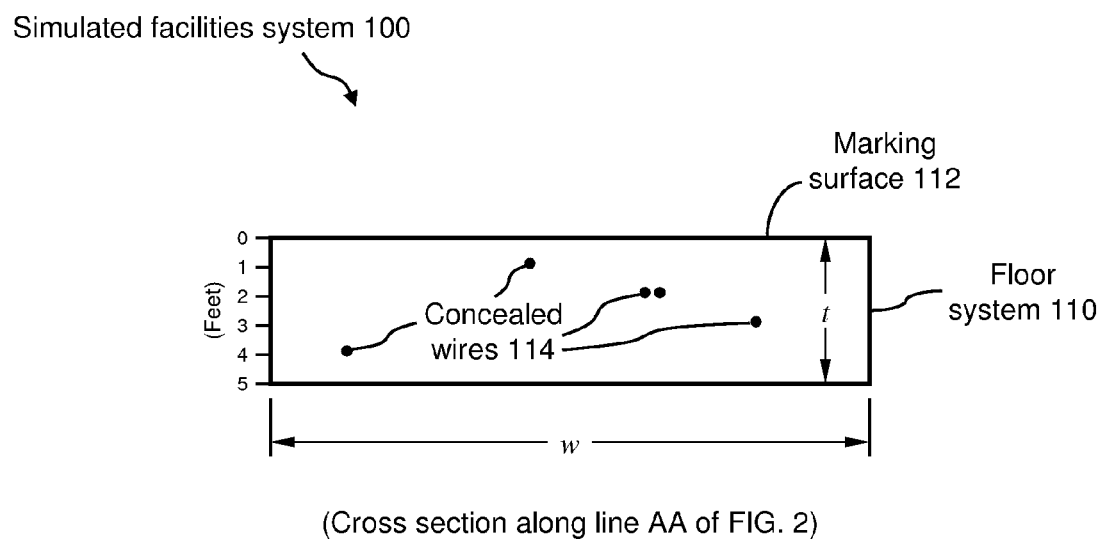
FIG. 2A is a cross-sectional view of the simulated facilities system of FIG. 2.

FIG. 2 is a perspective view of an embodiment of a simulated facilities system 100 for use in locate operations training, updating, and/or certification exercises. FIG. 2A is a cross-sectional view of the simulated facilities system of FIG. 2. Simulated facilities system 100 may include a floor system 110 on and/or in which the components of simulated facilities system 100 may be installed. Floor system 110 may be, for example, any false floor system, raised floor system, and/or stage-like structure that provides a volume of space in which any components may be installed in a manner that is not visible from outside of the floor system. The area and thickness of floor system 110 may be any dimensions that are useful for conducting locate operations training, updating, and/or certification exercises of, for example, locate technicians. In particular, floor system 110 has a length l, width w, and thickness t. The length and width may be any owner-specified dimensions that are suitable for the space in which simulated facilities system 100 is installed. The thickness may be, for example, from about 1 foot to about 6 feet.

An outer or upper surface of floor system 110 is hereafter referred to as marking surface 112, which is the surface of floor system 110 intended to be marked upon during locate operations training, updating, and/or certification exercises of locate technicians. Further, marking surface 112 may be formed of or otherwise coated with any material that allows simulated facilities system 100 to be reusable, such as any material that is removable, cleanable, washable, and/or otherwise able to be reconditioned. The characteristics of marking surface 112 may depend on the nature of the marking material that is dispensed thereon.

One or more concealed wires 114 are installed in floor system 110 of simulated facilities system 100. Concealed wires 114 are electrically conductive and may be installed at different depths relative to marking surface 112, as indicated in FIG. 2A. For example, certain concealed wires 114 may be installed at a depth of one foot, two feet, three feet, four feet, and so on.

Actual underground facilities may be installed a few feet underground, but the thickness of floor system 110 may be limited by practical considerations. For example, when the floor system is installed in a mobile environment, such as described with reference to FIG. 5C, the depths of concealed wires 114 may be less than the actual depths of underground facilities. For example, the depth of concealed wires 114 may be a few inches rather than a few feet. Further, the depths of concealed wires 114 may be differentiated by a smaller distance than in actual underground facilities. For example, one concealed wire 114 may be installed at a depth of about 2 inches, another at about 4 inches, another at about 6 inches, and so on. In such cases, system controller 130 may scale the locations of the simulated facilities to simulate the actual depths of the underground facilities so that, to the user, the simulated facilities system 100 appears to have underground facilities at normal depths.

For non-electric types of facilities, tracer wires are provided along the length thereof in order to allow a detection signal to be transmitted along the path for use in locate operations. However, electric types of facilities do not need tracer wires as electric lines are already energized. With respect to simulated facilities system 100, concealed wires 114 serve to simulate the tracer wires of non-electric types of facilities and/or to mimic the electric types of facilities themselves and thereby simulate underground facilities during locate operations. For example, concealed wires 114 may be energized to simulate electric power lines and/or to simulate the tracer wires that are provided along any other non-electric types of facilities, such as, but not limited to, gas, water, sewer, cable TV, and communications lines. Simulated facilities system 100 is designed for use with locating equipment, as described below.

Concealed wires 114 may take any path within the area of floor system 114. For example, concealed wires 114 may be substantially straight, curved, L-shaped, U-shaped, S-shaped, and any combinations thereof. Additionally, the paths of two or more concealed wires 114 may be allowed to cross one another, albeit at different depths below marking surface 112. Additionally, two or more concealed wires 114 may follow substantially the same path for a distance and then form a branch, such as a branch 115. Simulated facilities system 100 may further include one or more pedestals 124 for electrically connecting to and controlling concealed wires 114. Each pedestal 124 may electrically connect to and control one or more concealed wires 114. For example, a pedestal 124 may be associated with one, two, or three concealed wires 114. Additionally, each concealed wire 114 may have a pedestal 124 at both ends thereof or, alternatively, at one end.

Simulated facilities system 100 may also include at least one manhole 126. Manhole 126 may simulate an actual manhole. That is, manhole 126 may have a standard manhole cover, which may be removed to reveal a pedestal-like setup (not shown) that is beneath the level of marking surface 112, wherein the pedestal-like setup may be associated with one or more concealed wires 114 that lead away from manhole 126.

Pedestals 124 may be used to set the parameters of the detection signal (see FIG. 3) injected along concealed wires 114. Further, the combination of pedestals 124 and concealed wires 114 allows certain locate operations scenarios to be simulated, such as, but not limited to, a "beginner" scenario, an "intermediate" scenario, an "expert" scenario, a "broken tracer wire" scenario, a "long run" scenario, a "crossing" scenario, a "branching" scenario, and a "manhole" scenario. Details of examples of pedestals and concealed wires for supporting such scenarios in simulated facilities system 100 are described with reference to FIGS. 3 and 7.

In one embodiment, each pedestal 124 of simulated facilities system 100 may be manually and autonomously controlled. However, in another embodiment, simulated facilities system 100 may include a system controller 130 for configuring pedestals 124. System controller 130 may be, for example, any computing device that includes a processing unit capable of executing program instructions, a memory, and a communication interface. For example, system controller 130 may be any desktop computer, laptop computer, handheld computer, and/or networked computer.

Further, a set of predetermined locate operations routines 132 from which a user may select may reside on system controller 130. Locate operations routines 132 may be, for example, software routines programmed for defining the configuration of simulated facilities system 100 for locate operations training, updating, and/or certification exercises. For example, locate operations routines 132 may include, but are not limited to, a "beginner" routine, an "intermediate" routine, an "expert" routine, a "broken tracer wire" routine, a "long run" routine, a "crossing" routine, a "branching" routine, and a "manhole" routine.

Figures 3, 3A:
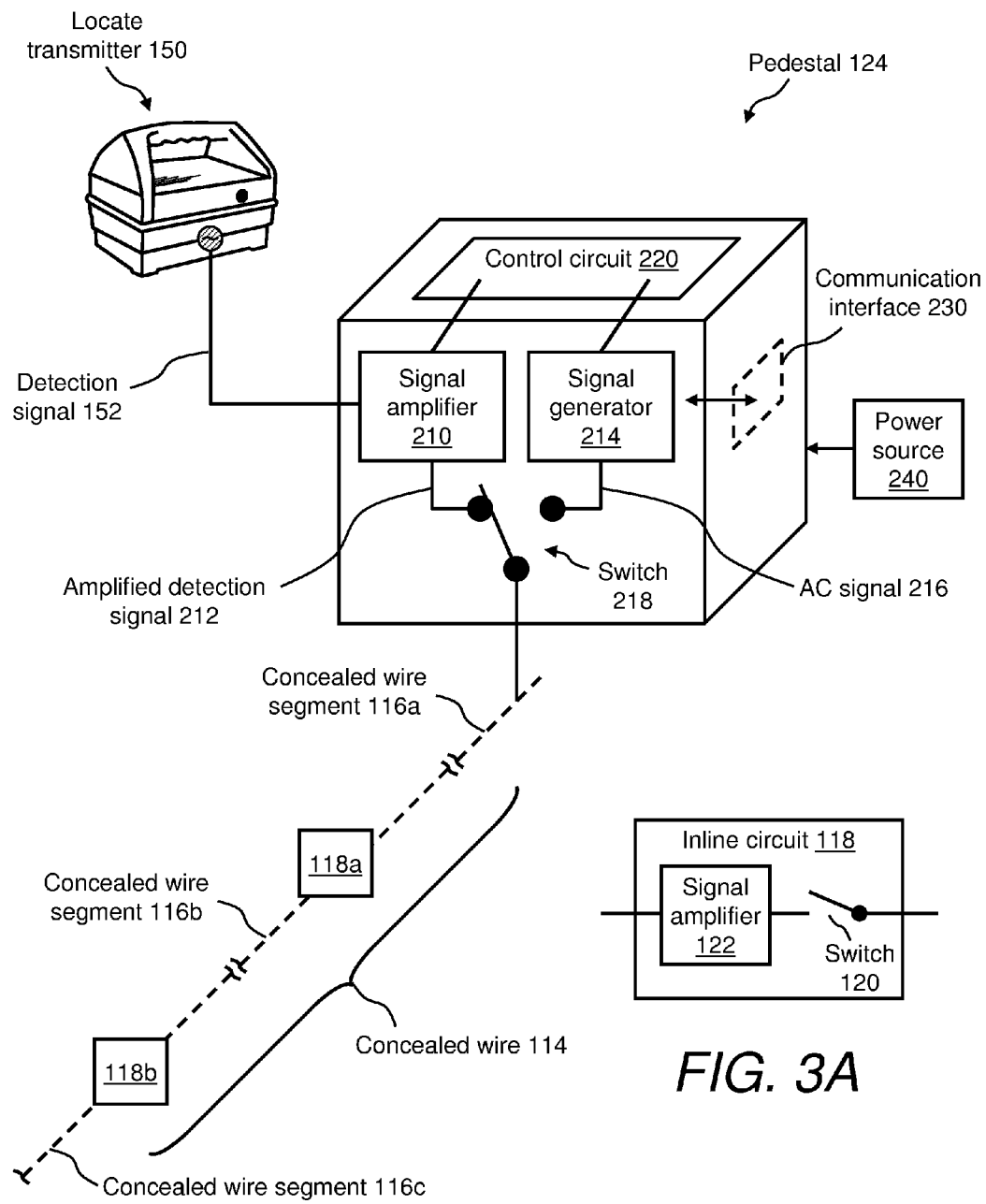
FIG. 3 is a functional block diagram of an example of a pedestal and details of concealed wires for use in the simulated facilities system.
FIG. 3A is a schematic block diagram of the inline circuit shown in FIG. 3.

FIG. 3 is a functional block diagram of an example of pedestal 124 and details of concealed wires 114 for use in simulated facilities system 100. In this example, pedestal 124 may include a signal amplifier 210 that supplies an amplified detection signal 212, and a signal generator 214 that supplies an alternating current (AC) signal 216. A switch 218 is provided to electrically connect either amplified detection signal 212 or AC signal 216 to the concealed wire 114 associated with pedestal 124. Switch 218 may be, for example, a semiconductor-based switching device or an electromechanical relay-based switching device. In either case, switch 218 has a current rating, voltage rating, and AC performance characteristics suitable for use in pedestal 124.

In one mode of operation when the position of switch 218 selects amplified detection signal 212, pedestal 124 may operate such that concealed wire 114 simulates any non-electric power line type of facility, such as, but not limited to, gas, water, sewer, cable TV, and communications facilities. This mode of operation is hereafter referred to as "non-electric" mode of pedestal 124. The input to signal amplifier 210 may be, for example, a detection signal from any standard locate transmitter device that is used during locate operations. For example, a locate transmitter 150 may supply a detection signal 152 connected to the input of signal amplifier 210. Signal amplifier 210 is used to condition (e.g., amplify or attenuate) detection signal 152 by any operator-specified amount which is manifested by way of amplified detection signal 212. For example, regardless of the amplitude of its input signal (e.g., detection signal 152) the amplitude of amplified detection signal 212 may be set (manually or programmed) to a specified value. A control circuit 220 may be provided for setting the amplitude (expressed as percent signal strength) of amplified detection signal 212.

In another mode of operation when the position of switch 218 selects AC signal 216, pedestal 124 may operate such that concealed wire 114 simulates an electric power line type of facility. This mode of operation is hereafter referred to as "electric" mode of pedestal 124. For example, the AC characteristics of AC signal 216 of signal generator 214 may simulate the AC characteristics of actual electric power facilities (e.g., 110 volts AC @ 60 Hertz (Hz), 220 volts AC @ 60 Hz, 440 volts AC @ 60 Hz, and so on). Again, control circuit 220 may be used for setting the amplitude (expressed as percent signal strength) of AC signal 216. Additionally, control circuit 220 may be used for setting the frequency of AC signal 216.

With respect to control circuit 220 of signal amplifier 210 and signal generator 214, there may be, for example, 10 amplitude settings, an example of which is shown in Table 1.

TABLE 1

Correlation of amplitude setting to percent signal strength

| Amplitude Setting | Percent signal strength |
|---|---|
| 1 | 100-90 |
| 2 | <90-80 |
| 3 | <80-70 |
| 4 | <70-60 |
| 5 | <60-50 |
| 6 | <50-40 |
| 7 | <40-30 |
| 8 | <30-20 |
| 9 | <20-10 |
| 10 | <10-00 |

With respect to control circuit 220 managing signal amplifier 210 and signal generator 214, a set of manual controls (not shown) may be provided for manually adjusting the settings of pedestal 124. In this way, each pedestal 124 may operate in a standalone mode. Additionally, by use of control circuit 220, the settings of pedestal 124 may be programmable for operating in an automated mode. For example, a communication interface 230 may be provided for connecting to, for example, system controller 130.

Communication interface 230 may be any wired and/or wireless communication interface by which information may be exchanged between any pedestal 124 and system controller 130 of simulated facilities system 100 (FIG. 2). Examples of wired communication interfaces may include, but are not limited to, USB ports, RS232 connectors, RJ45 connectors, Ethernet, and any combinations thereof. Examples of wireless communication interfaces may include, but are not limited to, an Intranet connection, Internet, Bluetooth® technology, Wi-Fi, Wi-Max, IEEE 802.11 technology, radio frequency (RF), Infrared Data Association (IrDA) compatible protocols, Local Area Networks (LAN), Wide Area Networks (WAN), Shared Wireless Access Protocol (SWAP), any combinations thereof, and other types of wireless networking protocols.

Additionally, a power source 240 may be associated with pedestal 124 for providing power to the active electronics thereof. Power source 240 may be customized for the environment in which simulated facilities system 100 is installed. For example, power source 240 may be an AC power source, any power system of a vehicle, a battery system, and any combinations thereof.

Referring again to FIG. 3, each concealed wire 114 may include multiple concealed wire segments 116. For example, concealed wire 114 of FIG. 3 may include concealed wire segments 116a, 116b, 116c, and so on. Providing the connection between concealed wire segments 116 may be an inline circuit 118. FIG. 3A is a schematic block diagram of an embodiment of inline circuit 118, which includes a switch 120 and a signal amplifier 122.

Switch 120 is provided to simulate a broken tracer wire that may occur anywhere along the length of concealed wire 114. For example, by opening switch 120 of inline circuit 118, the electrical path of concealed wire 114 is broken, thereby simulating a broken tracer wire of an actual underground facility. Signal amplifier 122 is used to condition (e.g., amplify or attenuate) amplified detection signal 212 of signal amplifier 210 by any specified amount, such as in steps as shown in Table 1. For example, the ability to reduce the amplitude of (i.e., attenuate) detection signal 212 at a specified distance away from pedestal 124 provides a way to simulate actual locate operations conditions, wherein for long runs of facilities an amplitude drop is expected at a distance from the source of the detection signal. Because the area of floor system 110 may not be sufficiently large to effect an actual drop in amplitude along concealed wire 114, signal amplifier 122 of any inline circuit 118 along the path may be used to simulate this phenomenon by attenuating amplified detection signal 212 at a point along concealed wire 114. A communications link (not shown) between inline circuits 118 and control circuit 220 may be used to set the states of any switches 120 and the amplitudes of any signal amplifiers 122 present along concealed wire 114. Using control circuit 220 these settings may be made via manual controls (not shown) and/or via programming.

While pedestal 124 of FIG. 3 is shown supporting one concealed wire 114, this configuration is exemplary only. Any pedestal 124 of simulated facilities system 100 may be configured to support one or more concealed wires 114.

Referring again to FIGS. 2, 2A, 3 and 3A, pedestals 124 of simulated facilities system 100 may be used to implement locate operations routines 132 of system controller 130 as follows.

In the "beginner" routine, the concealed wire 114 that is the subject of the location operation may be, for example, a continuous short path with no breaks, no branches, no manholes, no crossing facility lines, minimal changes in direction, and any other attributes suitable for a beginner locate technician. In this routine, signal amplifiers 210 of pedestals 124 and signal amplifiers 122 of inline circuits 118 of concealed wires 114 may be set to 100% signal strength and switches 120 of inline circuits 118 of concealed wires 114 may be closed.

In the "broken tracer wire" routine, at least one concealed wire 114 that is the subject of the location operation is simulating a facility having a broken tracer. In this routine, a switch 120 of an inline circuit 118 along the path of the concealed wire 114 is opened in order to break the continuity of the concealed wire 114, thereby simulating a broken tracer wire.

In the "long run" routine, the concealed wire 114 that is the subject of the location operation is simulating a facility that runs a long distance. In this routine, an amplified detection signal 212 of a switch 120 of an inline circuit 118 along the path of the concealed wire 114 is attenuated to effect a drop in amplitude at a point along the concealed wire 114, thereby simulating an expected amplitude drop at a distance along a long facility line.

In the "crossing" routine, at least two concealed wires 114 that are the subject of the location operation are crossing at different depths with respect to marking surface 112 of floor system 110. The at least two crossing concealed wires 114 are energized.

In the "branching" routine, at least two concealed wires 114 that are the subject of the location operation are first running along the same path and then at least one concealed wire 114 branches off, such as branch 115 of FIG. 2. The at least two concealed wires 114 are energized.

In the "manhole" routine, at least one concealed wire 114 that is the subject of the location operation originates in a manhole, such as manhole 126 of FIG. 2.

The "intermediate" and "expert" routines may be, for example, any combinations of the above routines that are suitable for achieving a specified degree of difficulty.

Figure 4:
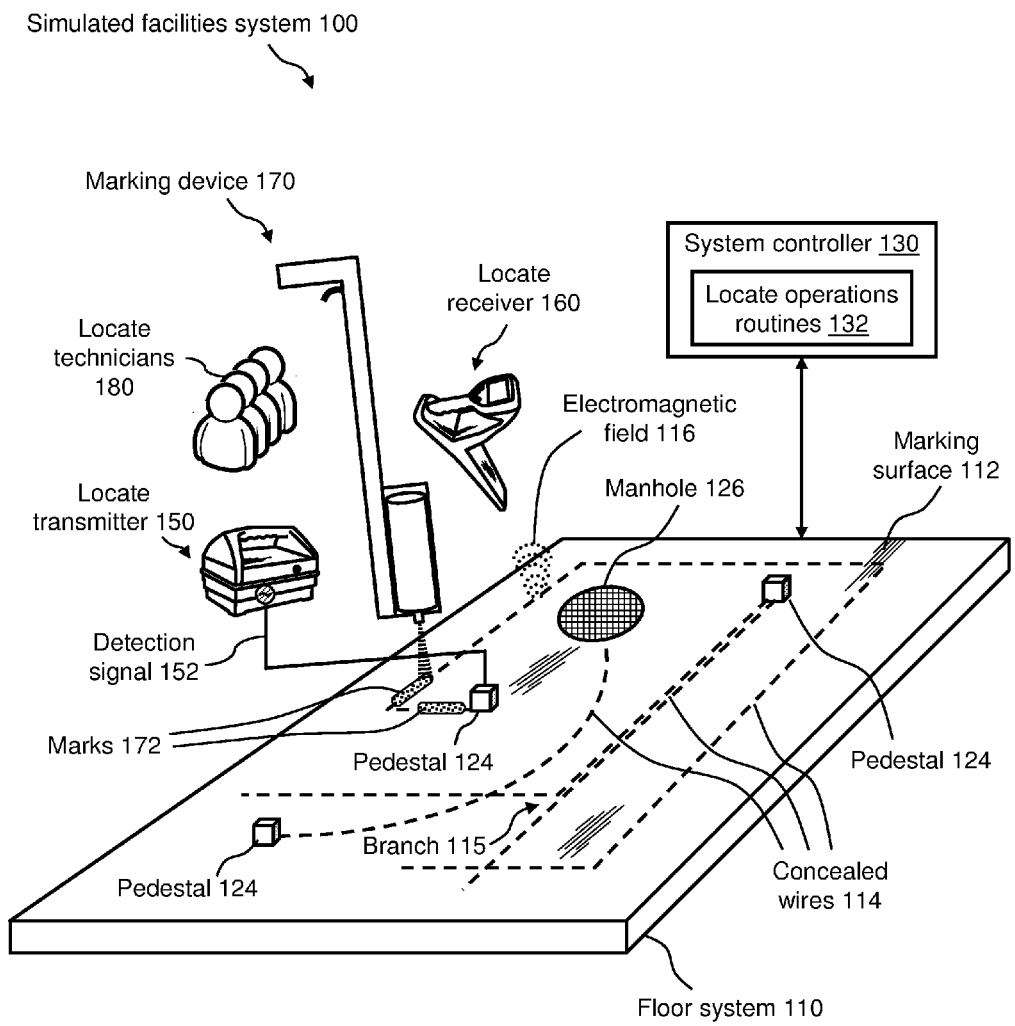
FIG. 4 is a perspective view of the simulated facilities system in use.

FIG. 4 is a perspective view of simulated facilities system 100 in use. Simulated facilities system 100 is suitable for use with standard, specialized and/or programmable locating equipment. For example, users, such as locate technicians 180, may use locate transmitter 150, as described above in connection with FIG. 3. In the context of simulated facilities system 100, locate technicians 180 may be, for example, locate technicians in training and/or locate technicians undergoing periodic skills assessment and/or new training.

Locate transmitter 150 generates detection signal 152 for connecting to and energizing a concealed wire 114. In particular, a user may connect locate transmitter 150 to a pedestal 124 of a concealed wire 114 of interest. During locate operations, detection signal 152 may be provided along the concealed wire 114, causing an electromagnetic field (e.g., electromagnetic field 116) to be present along concealed wire 114. This electromagnetic field may be detected via, for example, a locate receiver device 160. In locate operations, an electromagnetic field, or lack thereof, detected by the locate receiver device indicates the presence or absence of a facility.

Locate receiver device 160 may be, for example, any commercially available locate receiver device. In one example, locate receiver device 160 may be an electronic, geo-enabled locate receiver device. In one example, locate receiver device 160 may include, but is not limited to, components for capturing information about the detection signal strength and frequency, as well as facility depth; components for capturing information about environmental conditions; components for capturing information about the position, orientation, and movement of the locating equipment; and components for capturing image and audio information about locate operations.

Alternatively, because the depth of concealed wires 114 may be limited when installed in floor system 110, locate receiver 160 may be a locate receiver whose depth measurement has been specially calibrated to simulate depth information. For example, locate receiver 160 may be calibrated such that an actual depth measurement of 2 inches is displayed to the user as a depth of, for example, about 1 foot. The correlation of actual depth information to displayed depth information may be fixed or programmable. Table 2 shows an example of how locate receiver 160 may be calibrated to simulate depth information during locate operations training, updating, and/or certification exercises.

TABLE 2

Correlation of actual depth information to displayed depth information

| Actual Depth Measurement | Displayed Depth Measurement |
| --- | --- |
| about 1 inch | about 0.5 feet |
| about 2 inches | about 1.0 feet |
| about 3 inches | about 1.5 feet |
| about 4 inches | about 2.0 feet |
| about 5 inches | about 2.5 feet |
| about 6 inches | about 3.0 feet |
| about 7 inches | about 3.5 feet |
| about 8 inches | about 4.0 feet |
| about 9 inches | about 4.5 feet |
| about 10 inches | about 5.0 feet |

When the presence of a concealed wire 114 is detected, a marking device, such as a marking device 170, is used to dispense a marking material on marking surface 112 of floor system 110 in order to indicate the path of the concealed wire 114 of interest. Marking material may be any material, substance, compound, and/or element which may be used separately or in combination to mark, signify, and/or indicate the presence or absence of a facility. Examples of marking materials may include, but are not limited to, paint, chalk, dye, and/or marking powder. Referring to FIG. 4, marking device 170 is shown dispensing marking material to create a set of marks 172 on marking surface 112 of floor system 110.

With respect to providing a reusable marking surface 112, preferably the marks 172 are not permanent marks and may be removed. In the case of standard marking material that is used in locate operations, the coating of marking surface 112 is preferably suited for cleaning and/or washing away marking material. For example, marking surface 112 may be coated with an adhesion inhibiting film/layer and/or an easily removable film/layer, or the like. In one example, marking surface 112 may be formed of standard glass or an acrylic glass, which, for example, is commonly known by the trade name Plexiglas®. In another example, marking surface 112 may be coated with a commercially available coating that has nonstick qualities, such as a Teflon®-based coating. In yet another example, marking surface 112 may be formed of one or more layers of tear-away film. In this example, once marked upon, the outermost film layer may be peeled away and removed, exposing a clean film layer beneath.

Additionally, instead of standard marking material, other washable or removable marking material may be dispensed from marking device 170, such as a water-soluble spray paint or a spray powder substance. For example, marking surface 112 may be coated with a commercially available "whiteboard" paint or coating and, thus, the marking material may be dry erase ink that is provided in aerosol form. Additionally, the marking material may be any easily removable foam material that can be dispensed from a marking device and then washed away, for example, using water.

Marking device 170 may be, for example, an electronic, geo-enabled marking device. Marking device 170 may be based, for example, on the marking devices that are described in U.S. patent application Ser. No. 11/696,606, filed Apr. 4, 2007 and published Oct. 9, 2008 as Publication No. 2008/0245299, entitled "Marking system and method" and U.S. patent application Ser. No. 11/685,602, filed Mar. 13, 2007 and published Sep. 19, 2008 as Publication No. 2008/0228294, entitled "Marking system and method with location and/or time tracking." In some embodiments, the marking device 170 may include software components and/or applications, such as, but is not limited to, a device health component, a marking data algorithm, a map viewer application, ticket processing software, a speech synthesis component, and an operating mode controller that allows the marking device to operate in multiple modes, such as, but not limited to, marking mode, landmark identification mode, solo mode, and group mode. Additionally, the marking device may include components for capturing information about the marking material; components for capturing information about environmental conditions; components for capturing information about the position, orientation, and movement of the marking device; and components for capturing image and audio information about locate operations.

Referring to FIGS. 2, 2A, 3, 3A and 4, the operation of simulated facilities system 100 may be summarized as follows. An operator, such as a locate operations training instructor (not shown), of simulated facilities system 100 uses system controller 130 and/or manual controls of pedestals 124 to (1) enable certain pedestals 124, (2) to set the enabled pedestals 124 to either "non-electric" mode or "electric" mode, (3) to set any amplitude settings, frequency settings, and/or other settings of the enabled pedestals 124, and (4) to set the states of any switches 120 and the amplitudes of any signal amplifiers 122 that are present along concealed wire 114. In this way, simulated facilities system 100 is initialized for a locate technician 180 that is in training to perform locate operations on concealed wires 114 that are simulating underground facilities. The locate technician 180 in training may use, for example, locate transmitter 150, locate receiver device 160, and marking device 170 during the locate operations training exercise.

The instructor may direct the locate technician 180 to a "non-electric" mode pedestal 124. The locate technician 180 is expected to properly connect detection signal 152 of locate transmitter 150 to the pedestal 124 of interest. The locate technician 180 is then expected to use locate receiver device 160 to detect the presence or absence of a concealed wire 114. The path of the concealed wire 114 is unknown to the locate technician 180 in training because it is not visible within floor system 110. When the presence of the concealed wire 114 is detected, the locate technician 180 uses marking device 170 to dispense a marking material on marking surface 112 of floor system 110 to indicate the path of the concealed wire 114 of interest. This process may be repeated for any number of "non-electric" mode pedestals 124.

Next, the instructor may direct the locate technician 180 to an "electric" mode pedestal 124. The locate technician 180 is expected not to connect detection signal 152 of locate transmitter 150 to the pedestal 124 of interest because an electric power line supplies its own EM energy source. The locate technician 180 is then expected to use locate receiver device 160 to detect the presence or absence of a concealed wire 114. The path of the concealed wire 114 is unknown to the locate technician 180 in training because it is not visible within floor system 110. When the presence of the concealed wire 114 is detected, the locate technician 180 uses marking device 170 to dispense a marking material on marking surface 112 of floor system 110 to indicate the path of the concealed wire 114 of interest. This process may be repeated for any number of "electric" mode pedestals 124.

Upon completion of the training exercise, the instructor may review with the locate technician 180 in training the quality of the locate operation that was performed using simulated facilities system 100.

Figure 5A:
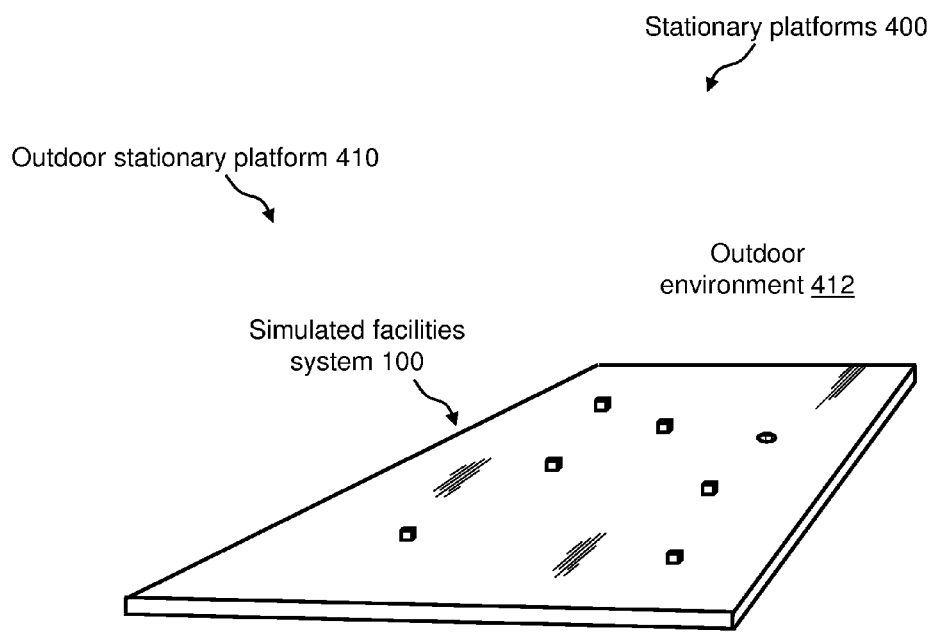
FIG. 5A is a perspective view of an example of an outdoor stationary platform in which the simulated facilities system may be installed.
Figure 5B:
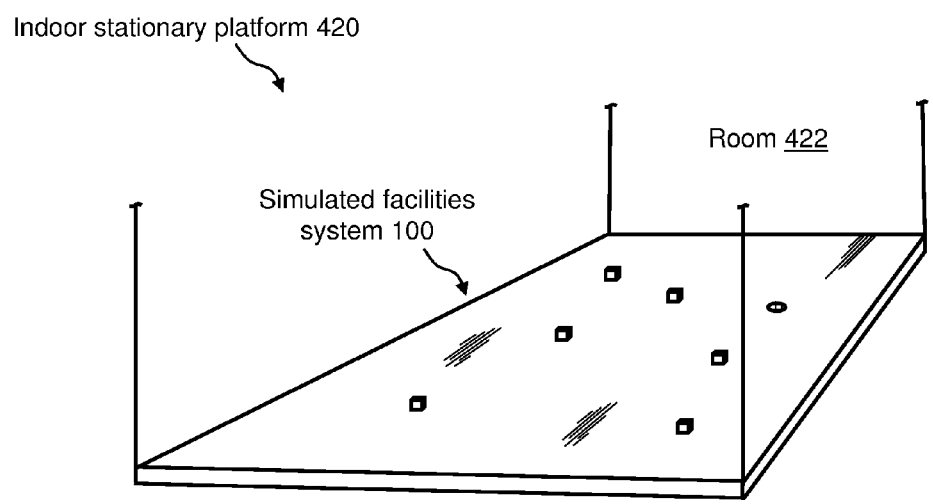
FIG. 5B is a perspective view of an example of an indoor stationary platform in which the simulated facilities system may be installed.

FIGS. 5A and 5B are perspective views of examples of stationary platforms 400 in which simulated facilities system 100 may be installed. In the embodiment of FIG. 5A, an outdoor stationary platform 410 includes simulated facilities system 100 installed in an outdoor environment 412, which is a substantially permanent and dedicated outdoor location for simulated facilities system 100. In the embodiment of FIG. 5B, an indoor stationary platform 420 includes simulated facilities system 100 installed in a room 422 of a building (not shown), which is a substantially permanent and dedicated indoor location for simulated facilities system 100.

An aspect of stationary platforms 400 in which simulated facilities system 100 may be installed is that they demonstrate the flexibility and versatility of the design of simulated facilities system 100 in providing capabilities and/or convenience that locate companies may need with respect to locate operations training, updating, and/or certification exercises.

Figure 5C:
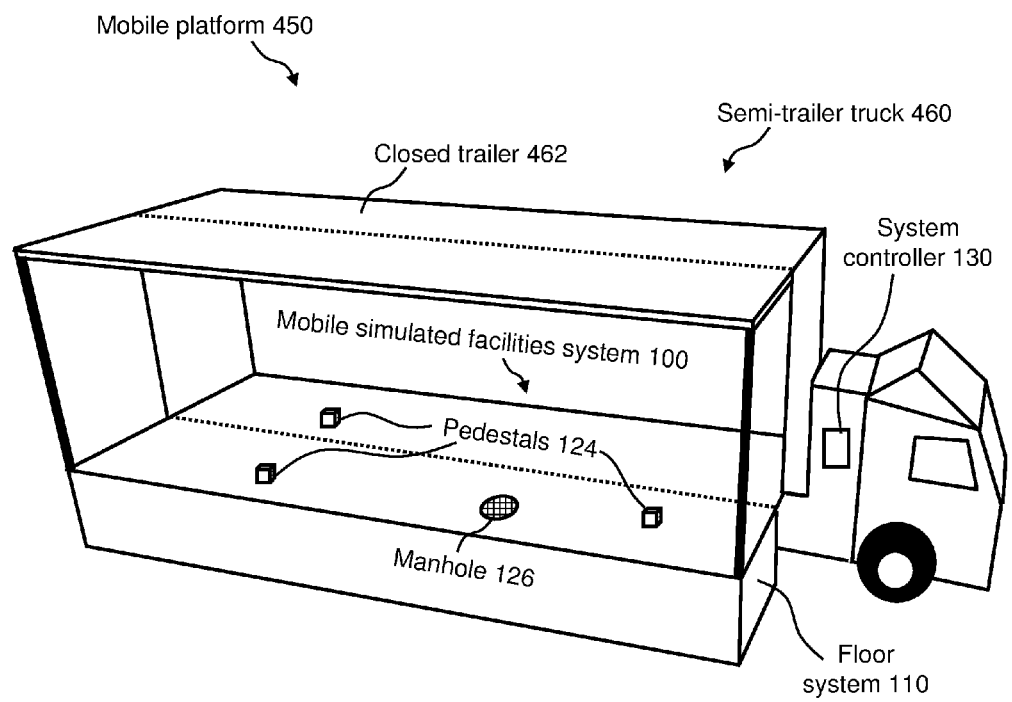
FIG. 5C is a perspective view of an example of a mobile platform in which the simulated facilities system may be installed.

FIG. 5C is a perspective view of an example of a mobile platform 450 in which mobile simulated facilities system 100 may be installed. In this example, mobile simulated facilities system 100 is installed in a semi-trailer truck 460 (also known as a tractor-trailer truck) having a closed trailer 462 in which floor system 110 is installed. Further, closed trailer 462 may be designed to open from the side, and floor system 110 of mobile simulated facilities system 100 is designed to slide or fold out of the side of closed trailer 462 for convenient access and to provide maximum working area. Closed trailer 462 may have standard dimensions. For example, closed trailer 462 may be about 28, 45, 48, 53, or 57 feet long by about 102 inches wide. In this example, when mobile simulated facilities system 100 is in use, the area of floor system 110 may be about 28, 45, 48, 53, or 57 feet long by about 200 inches wide. Further, when mobile simulated facilities system 100 is in use, the portion of floor system 110 that is outside of closed trailer 462 may provide additional depth, which may be useful, for example, to accommodate the use of manhole 126.

Mobile platforms are not limited to side-opening semi-trailer trucks. Mobile simulated facilities system 100 may be installed in end-opening semi-trailer trucks, whereby floor system 110 is designed to slide or fold out of the end of the trailer. Further, instead of a closed trailer, semi-trailer truck 460 may include an open flatbed trailer. Further, instead of a semi-trailer truck, other mobile vehicles may be used, such as, but not limited to, a straight truck, a flatbed trailer pulled by a light truck, and a bus.

Mobile platforms in which mobile simulated facilities system 100 may be installed are not limited to land vehicles. Any mobile watercraft or any aircraft may be suitable for installing mobile simulated facilities system 100.

An aspect of mobile platforms in which mobile simulated facilities system 100 may be installed is that mobile simulated facilities system 100 may be easily transported to any location for conducting locate operations training, updating, and/or certification exercises for locate technicians.

Figure 6:
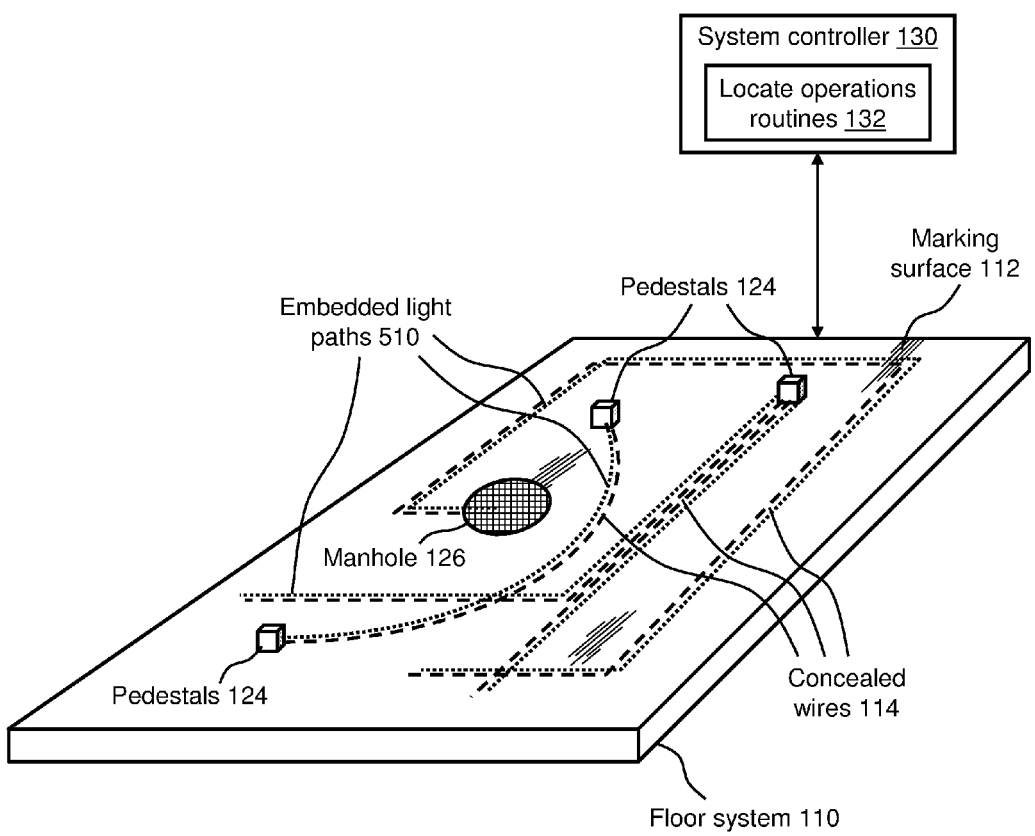
FIG. 6 is a perspective view of a simulated facilities system for use in locate operations training, updating, and/or certification exercises, according to another embodiment of the present invention.

FIG. 6 is a perspective view of a simulated facilities system 500, in accordance with another embodiment of a simulated facilities system for use in locate operations training, updating, and/or certification exercises. In this embodiment, simulated facilities system 500 includes embedded light paths for indicating the path of the simulated underground facilities.

Simulated facilities system 500 is substantially the same as simulated facilities system 100 described with reference to FIGS. 2 through 5C, except that it further includes a set of embedded light paths 510. Embedded light paths 510 substantially follow the respective paths of concealed wires 114. Embedded light paths 510 may be deactivated during locate operations. However, upon completion of a training, updating, and/or certification exercise, embedded light paths 510 may be activated. The purpose of embedded light paths 510 is to provide a convenient method of showing, for example, the locate technician 180 in training the expected path of the marking material to be dispensed during the locate operations. Upon completion of the exercise, embedded light paths 510 may be activated to indicate the expected path of, for example, marks 172 that are dispensed by marking device 170. The expected path of marks 172, as indicated by embedded light paths 510, may then be compared to the actual path of marks 172 that were dispensed. Further, the spacing of the illumination devices (see FIG. 7) of embedded light paths 510 may correlate to the expected spacing of marks 172 according to best practices guidelines. An aspect of embedded light paths 510 is that it provides a convenient visual tool that can be used for evaluating and coaching locate operations that are performed by, for example, locate technicians 180 in training. Details of a pedestal that supports embedded light paths 510 are described with reference to FIG. 7.

Figure 7:
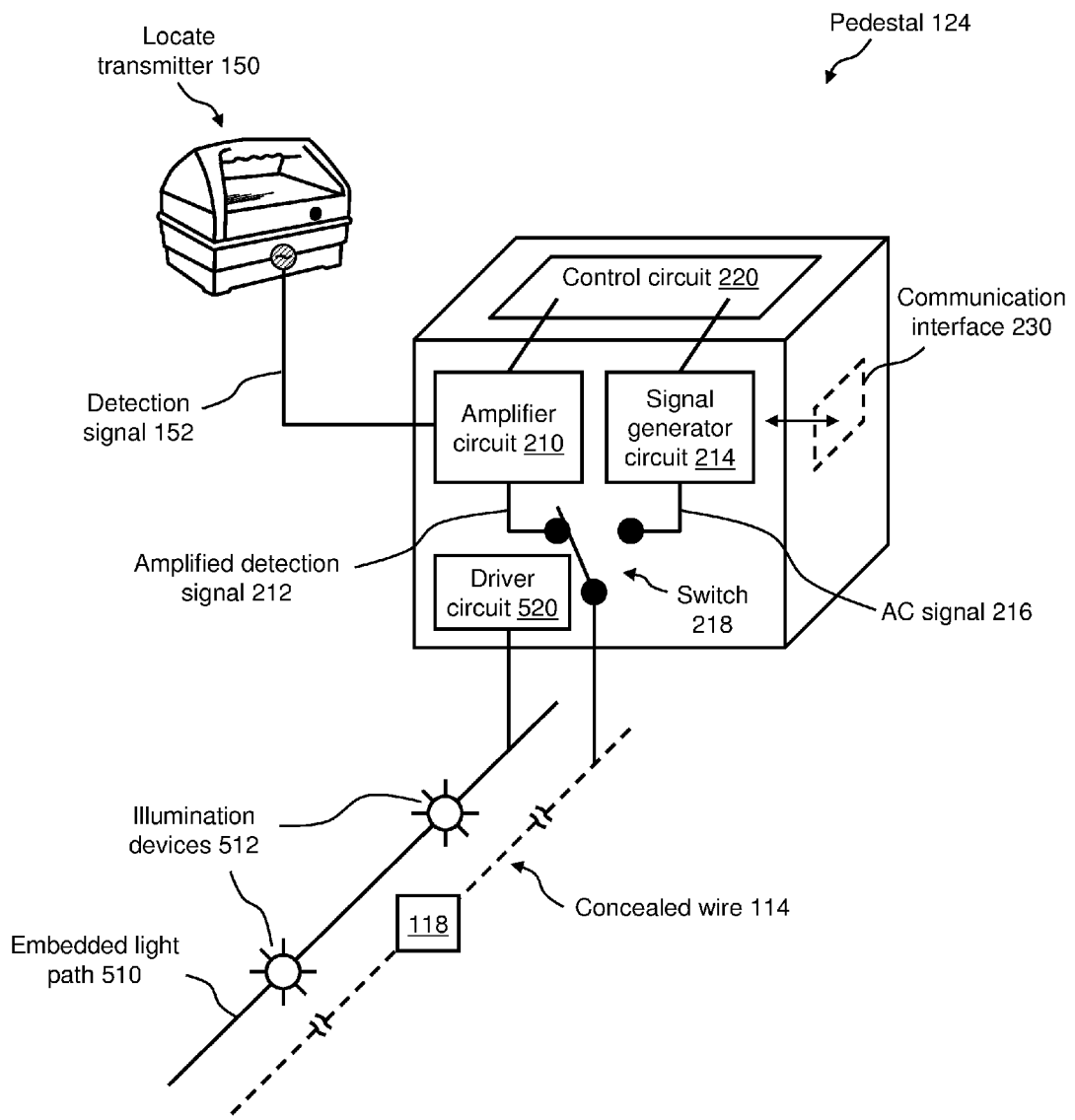
FIG. 7 is a functional block diagram of an example of a pedestal for use in the simulated facilities system of FIG. 6.

FIG. 7 is a functional block diagram of pedestal 124 for use in the simulated facilities system 500 of FIG. 6. In this example, pedestal 124 further includes a driver circuit 520 for driving one or more illumination devices 512 of embedded light paths 510. In one example, illumination devices 512 may be light-emitting diodes (LEDs). In this example, driver circuit 520 is designed to drive LEDs. Further, control circuit 220 includes the capability to control driver circuit 520 for activating and deactivating illumination devices 512 manually and/or via programming.

Additionally, in any embodiment that includes embedded light paths 510, marking surface 112 of floor system 110 is semi-transparent and/or changeable between transparent and opaque states. In one example, marking surface 112 of floor system 110 is sufficiently opaque that concealed wires 114 and embedded light paths 510 are not visible during locate operations. At the same time, marking surface 112 is sufficiently transparent to allow light emitted from illumination devices 512 to be visible when activated. In this example, marking surface 112 of floor system 110 may be a tinted (or polarized) glass or Plexiglas material, such as used in automobile windows. In another example, marking surface 112 of floor system 110 may be changeable between transparent and opaque states. In this example, marking surface 112 of floor system 110 may be liquid crystal switchable glass, such as the switchable glass available from Elmont Glass Company (Garden City Park, N.Y.).

Figure 8:
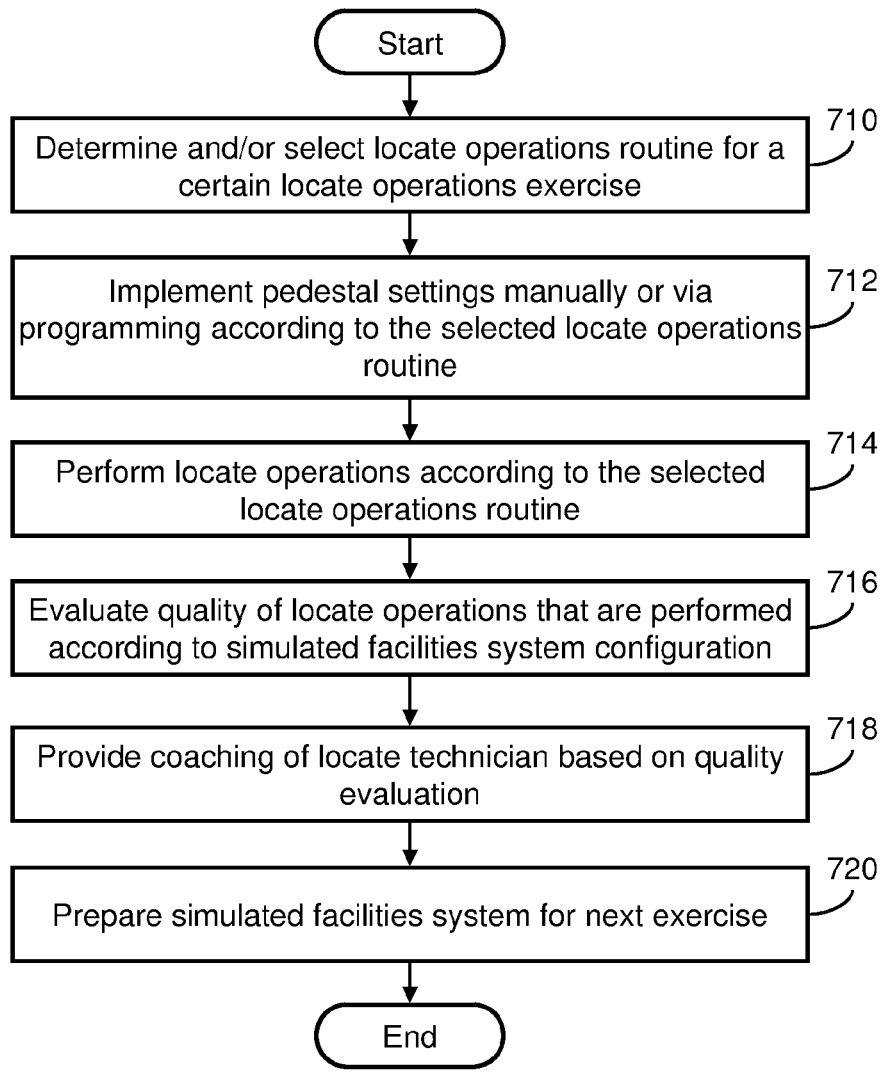
FIG. 8 is a flow diagram of an example of a method of using the simulated facilities system for, for example, training, updating, and/or certifying locate technicians.

FIG. 8 is a flow diagram of an example of a method 700 of using the simulated facilities system for, for example, training, updating, and/or certificating locate technicians. Method 700 may include, but is not limited to, the following acts, which are not limited to any order.

In act 710, the locate operations routine for a locate operations exercise may be determined and/or selected by an operator, such as a locate operations training instructor (not shown). For example, using system controller 130 the instructor may determine a locate operations routine with respect to specified locate operations training, updating, and/or certification exercises. Alternatively, the instructor may select a predetermined system configuration from the set of locate operations routines 132 of system controller 130.

In act 712, the pedestal settings are implemented manually or via programming according to the selected locate operations routine. For example, according to, for example, a locate operations routine 132 that is determined in step 710, the instructor uses system controller 130 and/or manual controls of pedestals 124 to: (1) enable certain pedestals 124, (2) to set the enabled pedestals 124 to either "non-electric" mode or "electric" mode, (3) to set any amplitude settings, frequency settings, and/or other settings of the enabled pedestals 124, and (4) to set the states of any switches 120 and the amplitudes of any signal amplifiers 122 along concealed wires 114.

In act 714, locate operations are performed according to the selected locate operations routine. For example, a locate technician 180 in training performs locate operations upon concealed wires 114 that are simulating underground facilities by use of "non-electric" mode pedestals 124 and/or "electric" mode pedestals 124. During the locate operations, once the presence of any concealed wire 114 of interest is detected, the locate technician 180 uses marking device 170 to dispense a marking material on marking surface 112 of floor system 110 to indicate the path of the concealed wire 114.

For example, and referring again to FIGS. 2 and 3, pedestals 124 of simulated facilities system 100 may be used to implement locate operations routines 132 of system controller 130 and locate operations may be performed according to the following routines.

In the "beginner" routine, the locate technician is expected to locate and mark the concealed wire 114 that is the subject of the location operation using, for example, locate transmitter 150, locate receiver 160, and marking device 170.

In the "broken tracer wire" routine, the locate technician is expected to locate and mark the concealed wire 114 that is the subject of the location operation using, for example, locate transmitter 150, locate receiver 160, and marking device 170. Further, the locate technician is expected to detect a broken tracer wire (by detecting an interruption in the detection signal) and take appropriate action. In one example, upon detecting the broken tracer wire, the locate technician attempts to relocate and connect locate transmitter 150 to a point of concealed wire 114 that is on the opposite side of the break point and then complete the locate operation.

In the "long run" routine, the locate technician is expected to locate and mark the concealed wire 114 that is the subject of the location operation using locate transmitter 150, locate receiver 160, and marking device 170. Further, the locate technician is expected to detect a drop in the signal strength of the detection signal at a point along the concealed wire 114. In response, the locate technician is expected to, for example, adjust the gain setting on the locate receiver 160, adjust the frequency setting of locate transmitter 150 which is generating the detection signal, and then resume the locate operation.

In the "crossing" routine, the locate technician is expected to locate and mark one or more crossing concealed wires 114 that are the subject of the location operation using locate transmitter 150, locate receiver 160, and marking device 170. In particular, the locate technician is expected to differentiate between the two crossing concealed wires 114 by depth information indicated by the locate receiver device.

In the "branching" routine, the locate technician is expected to locate and mark two or more concealed wires 114 that are the subject of the location operation using locate transmitter 150, locate receiver 160, and marking device 170. In particular, the locate technician is expected to recognize the branching concealed wire 114 using locate receiver 160. For example, the locate technician is expected to recognize the change in path of the concealed wires 114 at branch 115 of FIG. 1.

In the "manhole" routine, the locate technician is expected to use proper manhole cover removal techniques, to follow proper manhole gas detection protocols before entering the manhole, to use proper detection signal connection techniques for manholes, and to properly perform any other tasks related to locate operations involving manholes. The locate technician then locates and marks any concealed wires 114 that originate from, for example, manhole 126 using locate transmitter 150, locate receiver 160, and marking device 170.

In the "intermediate" and "expert" routines, the locate technician is expected to perform locate operations according to, for example, certain combinations of the above routines suitable for achieving the appropriate degree of difficulty.

In act 716, the quality of locate operations performed according to simulated facilities system configuration is evaluated. Upon completion of the training exercise, the instructor may review with the locate technician 180 in training the quality of the locate operation performed using simulated facilities system 100. In one example, upon completion of the exercise, embedded light paths 510 of FIGS. 6 and 7 may be activated to indicate the expected path of, for example, marks 172 that are dispensed by marking device 170. This expected path of marks 172, as indicated by embedded light paths 510, may then be compared to the actual path of marks 172 that were dispensed during the exercise. In this way, the expected path of the marking material to be dispensed during the locate operations exercise may be shown to the locate technician 180 in training.

In act 718, coaching of the locate technician is provided based on the quality evaluation. For example, the instructor may coach the locate technician with respect to the satisfactory and/or unsatisfactory results of the locate operations exercise.

In act 720, the simulated facilities system is prepared for the next exercise. For example, pedestals 124 may be disabled and, in particular, marking surface 112 of floor system 110 is cleaned or otherwise reconditioned in order to remove any marking material that is the result of the locate operations that were performed using simulated facilities system 100.

Figure 9:
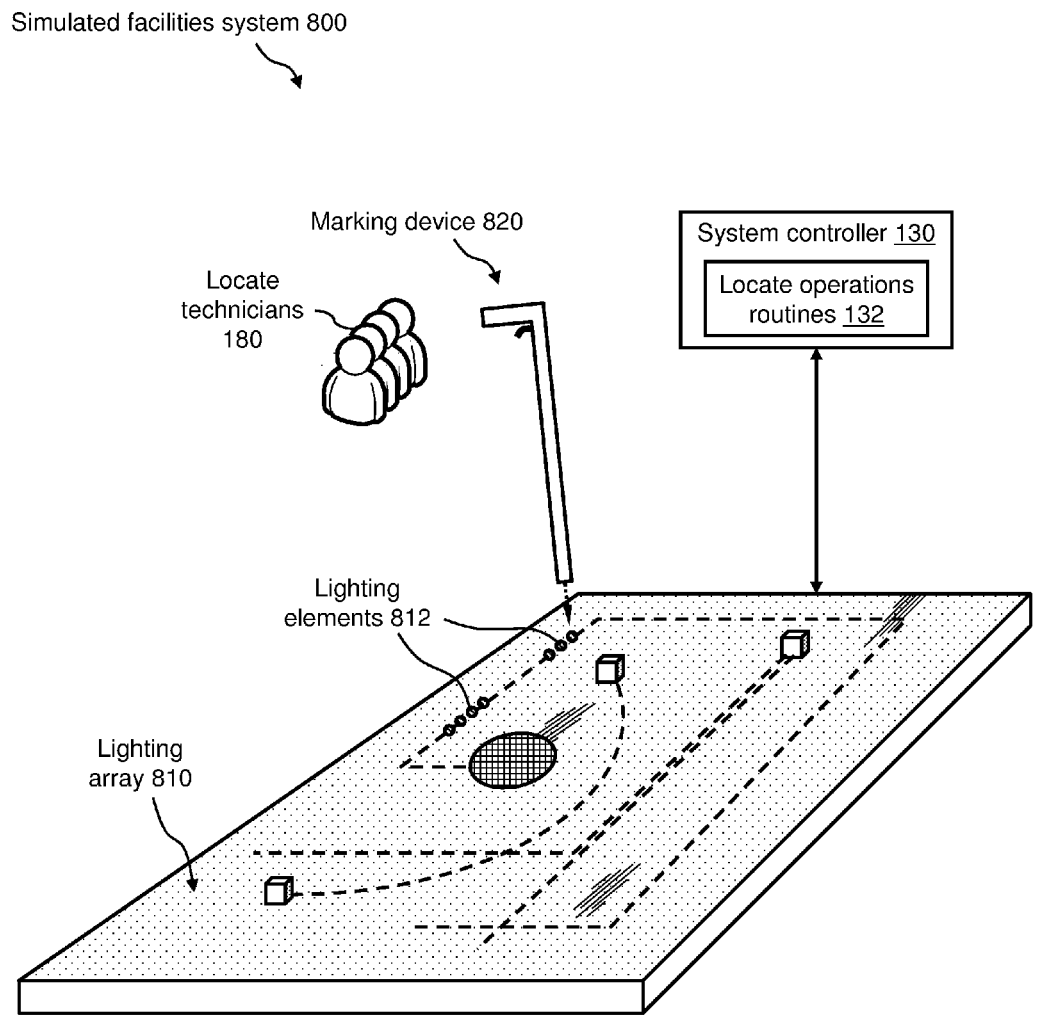
FIG. 9 is a perspective view of a simulated facilities system for use in locate operations training, updating, and/or certification exercises, according to yet another embodiment of the present invention.

FIG. 9 is a perspective view of a simulated facilities system 800, according to a further embodiment of a simulated facilities system for use in locate operations training, updating, and/or certification exercises. In this embodiment, simulated facilities system 800 includes a lighting array for simulating marks dispensed from a marking device.

Simulated facilities system 800 is substantially the same as simulated facilities system 100 and/or simulated facilities system 500 described with reference to FIGS. 2 through 8, except that simulated facilities system 800 further includes a lighting array 810 installed at and/or near marking surface 112 of floor system 110. Lighting array 810 may be an array of lighting elements 812. Details of lighting array 810 are described with reference to FIG. 10.

In this embodiment, lighting elements 812 may be activated by mechanisms that are installed in a marking device 820. For example, instead of dispensing marking material during locate operations, marking device 820 is equipped to transmit a signal that triggers the activation of lighting elements 812 within range. For example, a trigger signal may be generated with each actuation of marking device 820, which activates certain lighting elements 812, as if dispensing marking material. In this way, instead of dispensing marking material, lighting elements 812 are activated to simulate, for example, marks 172 of FIG. 4. Details of the mechanisms for activating lighting elements 812 using marking device 820 are described with reference to FIG. 11.

Figure 10:
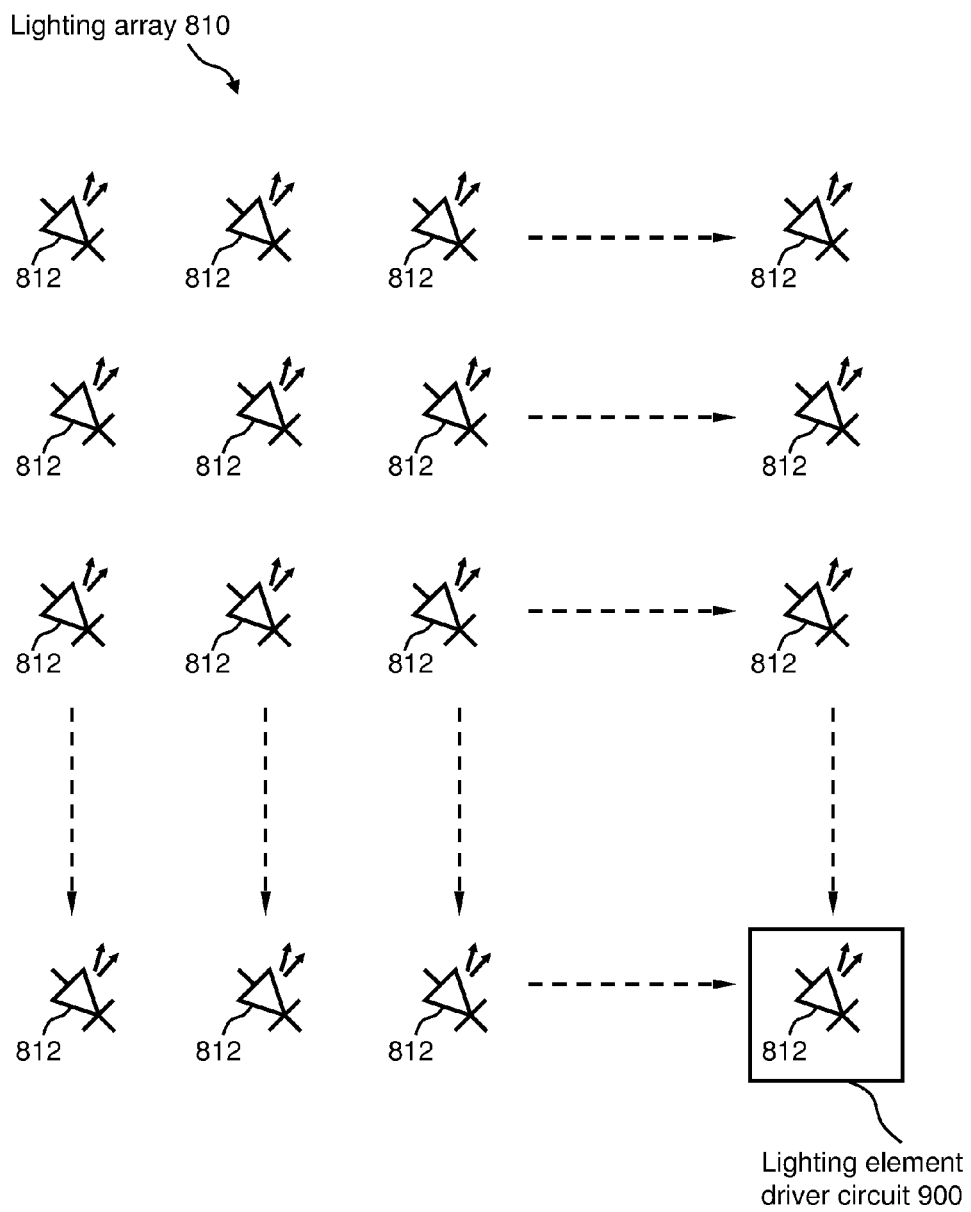
FIG. 10 is a top view of an example of a lighting array for use in the simulated facilities system of FIG. 9.

FIG. 10 is a top view of an example of lighting array 810 for use in simulated facilities system 800 of FIG. 9. FIG. 10 shows, for example, that lighting array 810 includes multiple lighting elements 812 arranged in rows and columns. Each individual lighting element 812 may be individually controlled by, for example, a respective lighting element driver circuit 900. In one example, each lighting element 812 may be an LED and, thus, each lighting element driver circuit 900 may be an LED driver circuit. Details of an example of lighting element driver circuit 900 used in combination with marking device 820 are described with reference to FIG. 11.

Figure 11:
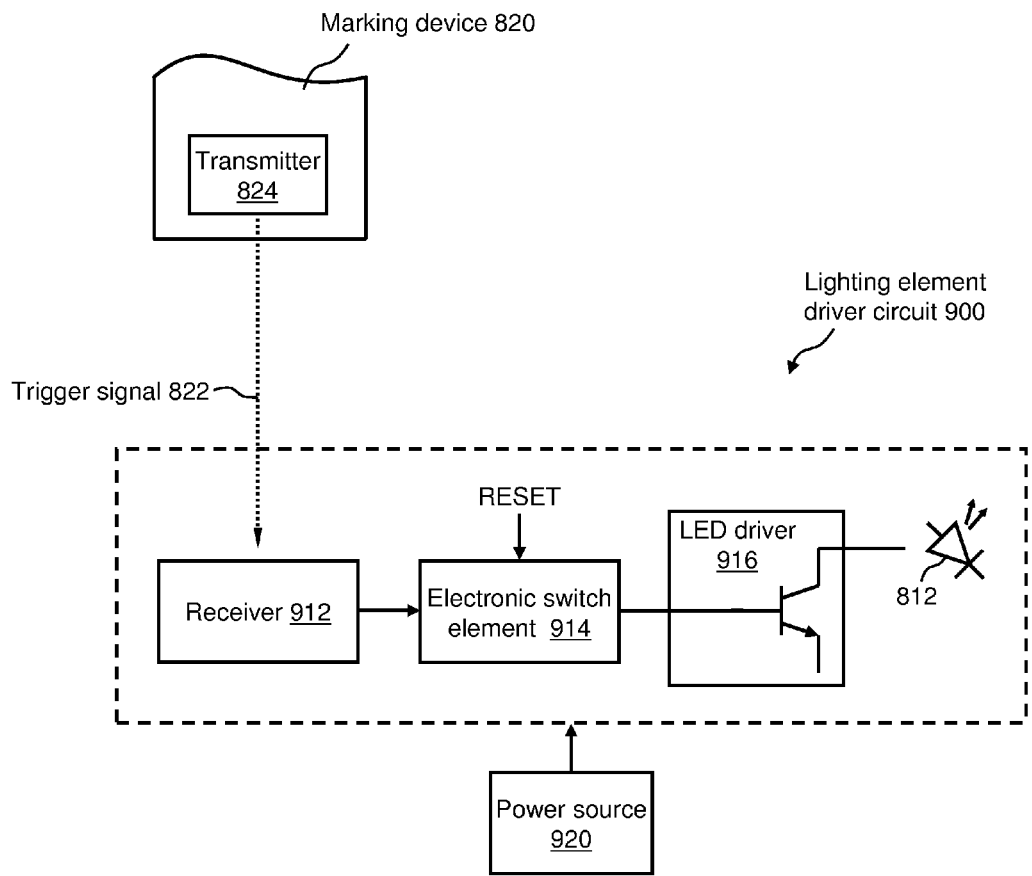
FIG. 11 is a functional block diagram of an example of a lighting element driver circuit for use in the simulated facilities system of FIG. 9.

FIG. 11 is a functional block diagram of an example of lighting element driver circuit 900 for use in simulated facilities system 800 of FIG. 9. In this example, lighting element driver circuit 900 may include a receiver 912, an electronic switch element 914, an LED driver 916, and lighting element 812 in the form of an LED. Further, a power source 920 provides power to lighting element driver circuit 900. Power source 920 may be any power source that meets the power requirements of receiver 912, electronic switch element 914, LED driver 916, and lighting element 812.

FIG. 11 also shows lighting element driver circuit 900 used in combination with marking device 820. For example, marking device 820 may include a transmitter 824. At each actuation of marking device 820, transmitter 824 generates trigger signal 822 that may be detected by receiver 912 of lighting element driver circuit 900. The transmitter 824 and the receiver 912 may utilize any low power, short range transmitter/receiver technology. In one example, transmitter 824 may be an infrared (IR) transmitter and receiver 912 may be an IR receiver. In another example, transmitter 824 may be a radio frequency (RF) transmitter and receiver 912 may be an RF receiver. Further, trigger signal 822 may be digitally coded and/or a modulated analog signal. In this way, receiver 912 may discriminate trigger signal 822 from background radiation.

When receiver 912 detects the presence of trigger signal 822 from transmitter 824 of marking device 820, an output signal of receiver 912 feeds electronic switch element 914, which is used to trigger LED driver circuit 916 and to activate lighting element 812. In one example, electronic switch element 914 may be any commercially available semiconductor-based switching element. Switch element 914 may include, for example, an electronic latch, flip flop or other storage element that remains in a set, or on, state until reset. Thus, lighting elements 812 remain on when marking device 820 is moved to another location above the marking surface 112, until switch elements 914 are reset.

The range of transmitter 824 is sufficiently short and narrow to trigger only those lighting elements 812 in close proximity to the tip of marking device 820 when actuated. In this way, a strip of activated lighting elements 812 serves to simulate marking material being dispensed without dispensing actual marking material. Further, a RESET signal is provided for resetting the state of electronic switch element 914 and deactivating lighting element 812. A controller, such as system controller 130, may be the source of the RESET signal.

An aspect of simulated facilities system 800, which includes lighting array 810 in combination with marking device 820, is that it eliminates the need for cleaning and/or otherwise reconditioning marking surface 112 of floor system 110 after each use. Instead, any lighting elements 812 that are activated during location operations may be deactivated upon completion of the locate operations training, updating, and/or certification exercise.

Figure 12A:
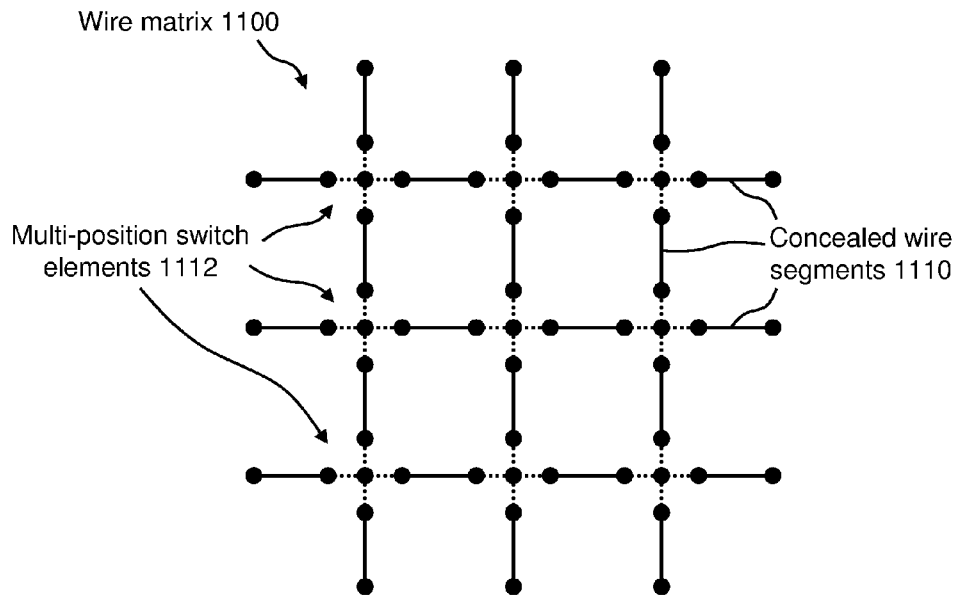
FIGS. 12A and 12B are top views of an example of a concealed wire matrix that is suitable for programming a concealed wire path for simulating facilities in a simulated facilities system.
Figure 12B:
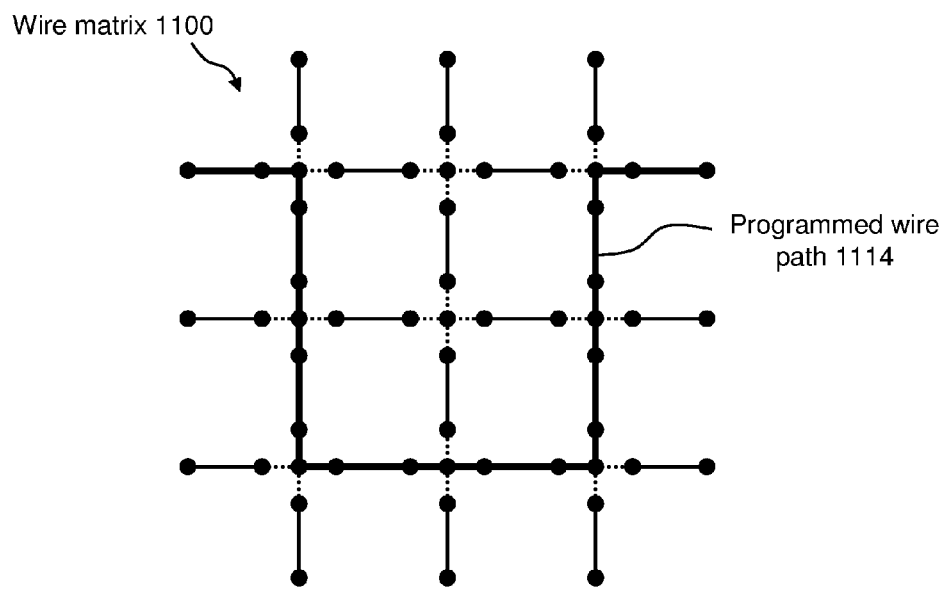

FIGS. 12A and 12B are top views of an example of a wire matrix 1100 suitable for programming a concealed wire path for simulating facilities in any simulated facilities system. Wire matrix 1100 may include a plurality of wire segments 1110 in combination with multi-position switch elements 1112. Each multi-position switch element 1112 may be, for example, a semiconductor-based switching element or an electromechanical relay-based switching element.

Multi-position switch elements 1112 allow various combinations of concealed wire segments 1110 to be electrically connected. In this way, the paths of concealed wires, which simulate underground facilities, are programmable. Wire matrix 1100 may be installed, for example, in floor system 110 of FIG. 2 in place of concealed wires 114 that have predetermined and fixed paths. FIG. 12B shows an example of a programmed concealed wire path 1114 formed by electrically connecting a combination of concealed wire segments 1110 via multi-position switch elements 1112. The positions of multi-position switch elements 1112 may be programmed, for example, by system controller 130 of FIG. 2.

An aspect of wire matrix 1100 installed in any simulated facilities system described herein is that it provides programmable paths of simulated underground facilities instead of predetermined fixed paths, thereby providing more flexibility with respect to configuring the simulated facilities system for performing locate operations training, updating, and/or certification exercises for locate technicians.

The simulated facilities systems of FIGS. 2 through 12B are not limited to using the locating equipment described herein. In other embodiments, simulated facilities system 100 may be used in combination with locating equipment, such as marking devices, locate receiver devices, and/or locate transmitters, that may be equipped with mechanisms for simulating locate operations, which may be used, for example, in locate technician training processes and/or for updating or evaluating the skills of locate technicians. In particular, a software module is provided for generating an arrangement of "virtual" facilities, the presence and/or absence of which may be displayed to a locate technician during, for example, a training, updating, and/or certification exercise. The actions of the locate technicians with respect to dispensing marking material that corresponds to the presence and/or absence of the virtual facilities are electronically captured, stored, and evaluated.

The simulated facilities systems of FIGS. 2 through 12B are not limited to using a substantially flat floor system. In other embodiments, simulated facilities system 100 may include a floor system that provides a structure wherein the marking surface may be implemented to provide different terrains and/or elevations.

The simulated facilities systems of FIGS. 2 through 12B are not limited to a floor system that has a substantially smooth marking surface. In other embodiments, simulated facilities system 100 may include a floor system that provides different textures of the marking surface. For example, the floor system may include removable tiles (that are cleanable) or disposable fabric to simulate different surface texture, such as, but not limited to, gravel, grass, and pavement.

The simulated facilities systems of FIGS. 2 through 12B are not limited to concealed wires 114 that have substantially fixed paths. In other embodiments, simulated facilities system 100 may include movable concealed wires 114, where the paths of concealed wires 114 may be adjusted depending on selected locate operations routines. In one example, movable concealed wires 114 may be implemented using concealed wires 114 that have flexibility in combination with, for example, a system of pulleys, cables, and any other guides for routing concealed wires 114. The system of pulleys, cables, and any other guides may be, for example, a motor driven system under the control of system controller 130.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present invention.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer may be used to implement system controller 130 in accordance with some embodiments. For example, the computer may include a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to and/or receive communications from other devices. The display unit(s) may be provided, for example, to allow a user to view various information in connection with execution of the instructions. The user input device(s) may be provided, for example, to allow the user to make manual adjustments, make selections, enter data or various other information, and/or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or"

as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A simulated facilities system to simulate underground facilities, comprising a physical floor system configured to define a simulated dig area, the physical floor system including a simulated marking surface to permit location and marking of simulated physical facilities, and one or more simulated physical facilities concealed in the physical floor system below the marking surface, wherein the physical floor system includes one or more of: at least one connection pedestal having a connection to at least one of the simulated physical facilities; at least one manhole having a connection to at least one of the simulated physical facilities; a raised floor having the marking surface thereon; and at least one manual pedestal configured for manual control of at least one of the simulated physical facilities; and a system controller configured to control the physical floor system by including one or more locate routines to control configuration and operation of the simulated physical facilities, wherein the simulated physical facilities comprise a programmable wire matrix including a plurality of interconnectable wire segments.

2. A simulated facilities system as defined in claim 1, wherein the simulated physical facilities include one or more wires located in the physical floor system below the marking surface.

3. A simulated facilities system as defined in claim 1, wherein the simulated physical facilities include two or more wires at different depths.

4. A simulated facilities system as defined in claim 3, wherein at least two of the wires at different depths cross to simulate crossing underground facilities.

5. A simulated facilities system as defined in claim 1, wherein the simulated physical facilities define at least one branch.

6. A simulated facilities system as defined in claim 1, wherein the physical floor system further includes the at least one connection pedestal having the connection to at least one of the simulated physical facilities.

7. A simulated facilities system as defined in claim 6, wherein the connection pedestal permits connection of one or more of the simulated physical facilities to an AC signal or to a detection signal.

8. A simulated facilities system as defined in claim 6, wherein the connection pedestal includes a first circuit to supply a detection signal to one or more of the simulated physical facilities and a second circuit to supply an AC signal to one or more of the simulated physical facilities.

9. A simulated facilities system as defined in claim 1, wherein the physical floor system further includes the at least one manhole having the connection to at least one of the simulated physical facilities.

10. A simulated facilities system as defined in claim 1, wherein at least one of the simulated physical facilities comprises a wire including the wire segments interconnected by respective inline circuits.

11. A simulated facilities system as defined in claim 10, wherein each of the respective inline circuits includes a switch connected in series with the wire segments and an amplifier to condition a signal on the wire segments.

12. A simulated facilities system as defined in claim 1, wherein the marking surface comprises a surface of the floor system.

13. A simulated facilities system as defined in claim 1, wherein the marking surface is replaceable.

14. A simulated facilities system as defined in claim 1, wherein the simulated physical facilities include at least one wire that follows a facilities path and an embedded light generator that follows the facilities path, wherein the embedded light generator includes a plurality of illumination devices.

15. A simulated facilities system as defined in claim 1, wherein the simulated physical facilities include light elements that are energized by actuation of a marking device in proximity to the light elements.

16. A simulated facilities system as defined in claim 8, wherein the system controller is configured to enable operation of the connection pedestal.

17. A simulated facilities system as defined in claim 8, wherein the system controller is configured to set a mode of operation of the connection pedestal.

18. A simulated facilities system as defined in claim 8, wherein the system controller is configured to control one or more settings of the first and second circuits in the connection pedestal.

19. A simulated facilities system as defined in claim 11, wherein the system controller is configured to control the switch in the inline circuit.

20. A simulated facilities system as defined in claim 11, wherein the system controller is configured to control the amplifier in the inline circuit.

21. A simulated facilities system as defined in claim 1, wherein the system controller is configured to control interconnection of the wire segments of the programmable wire matrix.

22. A simulated facilities system as defined in claim 14, wherein the system controller is configured to control the illumination devices of the embedded light generator.

23. A simulated facilities system as defined in claim 1, wherein the physical floor system further includes the at least one manual pedestal configured for manual control of at least one of the simulated physical facilities.

24. A simulated facilities system as defined in claim 1, wherein at least one of the simulated physical facilities is programmable.

25. A simulated facilities system as defined in claim 1, wherein the physical floor system comprises the raised floor having the marking surface thereon.

26. A simulated facilities system as defined in claim 1, wherein the marking surface is contoured to simulate the dig area.

27. A simulated facilities system as defined in claim 1, wherein the marking surface is textured to simulate the dig area.

28. A simulated facilities system as defined in claim 1, wherein one or more of the simulated physical facilities are movable within the physical floor system.

29. A simulated facilities system as defined in claim 1, wherein the floor system is configured for indoor installation.

30. A simulated facilities system as defined in claim 1, wherein the floor system is configured for outdoor installation.

31. A simulated facilities system as defined in claim 1, wherein the floor system is configured to be carried in a vehicle.

32. A simulated facilities system as defined in claim 31, wherein the floor system is dimensioned and shaped to fit within and be carried by a vehicle.

33. A simulated facilities system as defined in claim 31, wherein at least part of the floor system is extendable from the vehicle during simulation operations.

34. A simulated facilities system as defined in claim 31, wherein the floor assembly is configured to be installed in a trailer.

35. A simulated facilities system as defined in claim 34, wherein at least a section of the floor assembly slides or folds from a side or an end of the trailer.

36. A simulated facilities system as defined in claim 31, wherein the floor assembly is configured to permit location and marking of the simulated physical facilities when the physical floor system is at least partially within the vehicle.

37. A simulated facilities system as defined in claim 31, wherein the physical floor system is removable from the vehicle to permit location and marking of the simulated physical facilities.

38. A simulated facilities system as defined in claim 1, wherein the simulated physical facilities are located in the physical floor system at depths less than actual depths of underground facilities and wherein the system controller is configured to scale the locations of the simulated facilities to simulate the actual depths of underground facilities.

39. A method for simulating underground facilities, comprising: providing a physical floor system configured to define a simulated dig area, the physical floor system including a simulated marking surface to permit location and marking of simulated physical facilities, and one or more simulated physical facilities concealed in the physical floor system below the marking surface; wherein the physical floor system includes one or more of: at least one connection pedestal having a connection to at least one of the simulated physical facilities; at least one manhole having a connection to at least one of the simulated physical facilities; a raised floor having the marking surface thereon; and at least one manual pedestal configured for manual control of at least one of the simulated physical facilities; controlling the configuration and operation of the simulated physical facilities to define a facility locate routine; wherein controlling includes configuring the simulated physical facilities to simulate one or more of: a broken tracer wire routine for location and marking of the simulated physical facilities using the physical floor system, a long run routine for location and marking of the simulated physical facilities using the physical floor system, a crossing facilities routine for location and marking of the simulated physical facilities using the physical floor system, a branch routine for location and marking of the simulated physical facilities using the physical floor system, and a manhole routine for location and marking of the simulated physical facilities using the physical floor system, and performing location and marking of the simulated physical facilities according to the defined facility locate routine.

40. A method as defined in claim 39, wherein controlling includes configuring the simulated physical facilities to simulate one or more of a beginner routine, an intermediate routine, and an expert routine.

41. A method as defined in claim 39, wherein controlling includes selecting a complexity level of the facility locate routine from two or more different complexity levels of the facility locate routine.

42. A method for facility locate training comprising: providing a physical floor system configured to define a simulated dig area, the physical floor system including a simulated marking surface to permit location and marking of simulated facilities, and one or more simulated physical facilities concealed in the floor system below the marking surface; wherein the physical floor system includes one or more of: at least one connection pedestal having a connection to at least one of the simulated physical facilities; at least one manhole having a connection to at least one of the simulated physical facilities; a raised floor having the marking surface thereon; and at least one manual pedestal configured for manual control of at least one of the simulated physical facilities; configuring the simulated physical facilities to define a facility locate routine that includes one or more of: a broken tracer wire routine for simulated location and marking operation using the physical floor system, a long run routine for simulated location and marking operation using the physical floor system, a crossing facilities routine for simulated location and marking operation using the physical floor system, a branch routine for simulated location and marking operation using the physical floor system, and a manhole routine for simulated location and marking operation using the physical floor system, performing, by a user, simulated location and marking operations in accordance with the defined facility locate routine; evaluating the simulated location and marking operations; and coaching the user based on the evaluation of the simulated location and marking operations.

43. A physical floor system to simulate underground facilities in a simulated dig area, comprising: a simulated marking surface to permit location and marking of simulated physical facilities in the simulated dig area; wherein the simulated physical facilities comprise a programmable wire matrix including a plurality of interconnectable wire segments, and one or more simulated physical facilities concealed in the physical floor system below the marking surface, wherein the physical floor system includes one or more of: at least one connection pedestal having a connection to at least one of the simulated physical facilities; at least one manhole having a connection to at least one of the simulated physical facilities; a raised floor having the marking surface thereon; and at least one manual pedestal configured for manual control of at least one of the simulated physical facilities.

44. A mobile simulated facilities system to simulate underground facilities, comprising: a physical floor system configured to be carried in a vehicle and to define a simulated dig area, wherein the physical floor system includes one or more of: at least one connection pedestal having a connection to at least one of the simulated physical facilities; at least one manhole having a connection to at least one of the simulated physical facilities; a raised floor having the marking surface thereon; and at least one manual pedestal configured for manual control of at least one of the simulated physical facilities, the floor system including a simulated marking surface to permit location and marking of simulated physical facilities, wherein the simulated physical facilities comprise a programmable wire matrix including a plurality of interconnectable wire segments, and one or more simulated physical facilities concealed in the floor system below the marking surface; and a system controller configured to control the physical floor system by including one or more locate routines to control configuration and operation of the simulated physical facilities.

45. A method for simulating underground facilities, comprising: providing a physical floor system configured to be carried in a vehicle and to define a simulated dig area, the physical floor system including a simulated marking surface to permit location and marking of simulated physical facilities, and one or more simulated physical facilities concealed in the floor system below the marking surface; wherein the physical floor system includes one or more of: at least one connection pedestal having a connection to at least one of the simulated physical facilities; at least one manhole having a connection to at least one of the simulated physical facilities; a raised floor having the marking surface thereon; and at least one manual pedestal configured for manual control of at least one of the simulated physical facilities; transporting the physical floor system in the vehicle; controlling the configuration and operation of the simulated physical facilities to define a facility locate routine; wherein controlling includes configuring the simulated physical facilities to simulate one or more of : a broken tracer wire routine for simulated location and marking operation using the physical floor system, a long run routine for simulated location and marking operation using the physical floor system, a crossing facilities routine for simulated location and marking operation using the physical floor system, a branch routine for simulated location and marking operation using the physical floor system, and a manhole routine for simulated location and marking operation using the physical floor system, and performing location and marking of the simulated physical facilities according to the defined facility locate routine.

46. A method for facility locate training comprising: providing a physical floor system configured to be carried in a vehicle and to define a simulated dig area, the physical floor system including a simulated marking surface to permit location and marking of simulated physical facilities, and one or more simulated physical facilities concealed in the physical floor system below the marking surface; wherein the physical floor system includes one or more of: at least one connection pedestal having a connection to at least one of the simulated physical facilities; at least one manhole having a connection to at least one of the simulated physical facilities; a raised floor having the marking surface thereon; and at least one manual pedestal configured for manual control of at least one of the simulated physical facilities; transporting the physical floor system in the vehicle; configuring the simulated physical facilities to define a facility locate routine that includes one or more of : a broken tracer wire routine for simulated location and marking operation using the physical floor system, a long run routine for simulated location and marking operation using the physical floor system, a crossing facilities routine for simulated location and marking operation using the physical floor system, a branch routine for simulated location and marking operation using the physical floor system, and a manhole routine for simulated location and marking operation using the physical floor system, performing, by a user, simulated location and marking operations in accordance with the defined facility locate routine; evaluating the simulated location and marking operations; and coaching the user based on the evaluation of the simulated location and marking operations.

47. A mobile physical floor system to simulate underground facilities in a simulated dig area, comprising a simulated marking surface to permit location and marking of simulated physical facilities in the simulated dig area; wherein the simulated physical facilities comprise a programmable wire matrix including a plurality of interconnectable wire segments, and one or more simulated physical facilities concealed in the mobile physical floor system below the marking surface, wherein the mobile physical floor system includes one or more of: at least one connection pedestal having a connection to at least one of the simulated physical facilities; at least one manhole having a connection to at least one of the simulated physical facilities; a raised floor having the marking surface thereon; and at least one manual pedestal configured for manual control of at least one of the simulated physical facilities; the mobile physical floor system configured to be carried in a vehicle.

48. A mobile simulated facilities system to simulate underground facilities, comprising: a vehicle including a trailer; a physical floor system configured to be carried in the trailer and to define a simulated dig area, the physical floor system including a simulated marking surface to permit location and marking of simulated physical facilities, wherein the simulated physical facilities comprise a programmable wire matrix including a plurality of interconnectable wire segments, and one or more simulated physical facilities concealed in the physical floor system below the marking surface; wherein the physical floor system includes one or more of: at least one connection pedestal having a connection to at least one of the simulated physical facilities; at least one manhole having a connection to at least one of the simulated physical facilities; a raised floor having the marking surface thereon; and at least one manual pedestal configured for manual control of at least one of the simulated physical facilities; and a system controller configured to control the physical floor system by including one or more locate routines to control configuration and operation of the simulated physical facilities.

* * * * *